US012283262B2

(12) United States Patent
Balaguru et al.

(10) Patent No.: US 12,283,262 B2
(45) Date of Patent: Apr. 22, 2025

(54) TUNABLE SILENCER FOR AIR HANDLING UNIT

(71) Applicant: Air Distribution Technologies IP, LLC, Milwaukee, WI (US)

(72) Inventors: Rajavel Balaguru, New Cumberland, PA (US); Paul F. Bauch, York, PA (US); Roger Lee Howard, Seven Valleys, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 218 days.

(21) Appl. No.: 17/848,166

(22) Filed: Jun. 23, 2022

(65) Prior Publication Data

US 2022/0415298 A1 Dec. 29, 2022

Related U.S. Application Data

(60) Provisional application No. 63/214,655, filed on Jun. 24, 2021.

(51) Int. Cl.

*G10K 11/162* (2006.01)
*F24F 13/24* (2006.01)
*G10K 11/172* (2006.01)

(52) U.S. Cl.

CPC .......... *G10K 11/162* (2013.01); *G10K 11/172* (2013.01); *F24F 2013/242* (2013.01); *F24F 2013/245* (2013.01)

(58) Field of Classification Search

CPC ................. G10K 11/162; G10K 11/172; F24F 2013/245; F24F 2013/242
See application file for complete search history.

(56) References Cited

U.S. PATENT DOCUMENTS

| | | | | | |
|---|---|---|---|---|---|
| 4,287,962 | A * | 9/1981 | Ingard | F02M 35/1266 181/268 |
| 5,869,792 | A * | 2/1999 | Allen | F16L 55/0333 181/224 |
| 9,574,791 | B2 * | 2/2017 | Lind | F24F 13/24 |
| 2005/0199439 | A1 * | 9/2005 | Goenka | F02M 35/1261 181/276 |
| 2010/0077754 | A1 * | 4/2010 | Jangili | F01D 25/30 60/725 |
| 2010/0175411 | A1 * | 7/2010 | Choi | F24F 1/0047 62/426 |
| 2017/0219153 | A1 * | 8/2017 | Hill | F16L 55/0331 |
| 2017/0276397 | A1 * | 9/2017 | Mouratidis | F24F 13/08 |

* cited by examiner

*Primary Examiner* — Forrest M Phillips
(74) *Attorney, Agent, or Firm* — Fletcher Yoder, P.C.

(57) ABSTRACT

A silencer module for an air handling unit includes a first baffle and a second baffle spaced apart from the first baffle to form an air channel between the first baffle and the second baffle. The air channel is configured to receive a fluid flow and direct the fluid flow through the silencer module. The silencer module also includes a reactive acoustic feature formed in the first baffle. The reactive acoustic feature includes an attenuation profile configured to reduce propagation of tonal acoustic waves through the air channel.

20 Claims, 22 Drawing Sheets

TUNABLE SILENCER FOR AIR HANDLING UNIT

CROSS-REFERENCE TO RELATED APPLICATION

This application claims priority from and the benefit of U.S. Provisional Application No. 63/214,655, entitled "TUNABLE HYBRID SILENCER FOR AIR HANDLING APPLICATIONS," filed Jun. 24, 2021, which is herein incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system may be used to thermally regulate an environment, such as a building, home, or other structure. In some cases, an air handling unit of the HVAC system may direct a flow of fresh outdoor air into a building to provide ventilation and improved air quality within the building, while discharging a flow of return air from the building into an ambient environment, such as the atmosphere. Particularly, the air handling unit may include a fan assembly or other flow generating device that facilitates air circulation through the air handling unit and/or throughout ductwork of the building. In certain cases, operation of the fan assembly and/or other components of the air handling unit may generate audible noise that propagates through the air handling unit and into the ductwork. Unfortunately, the audible noise generated by the air handling unit may be undesirable to occupants within the building or persons situated near the building ductwork.

SUMMARY

The present disclosure relates to a silencer module for an air handling unit. The silencer module includes a first baffle and a second baffle spaced apart from the first baffle to form an air channel between the first baffle and the second baffle. The air channel is configured to receive a fluid flow and direct the fluid flow through the silencer module. The silencer module also includes a reactive acoustic feature formed in the first baffle. The reactive acoustic feature includes an attenuation profile configured to reduce propagation of tonal acoustic waves through the air channel.

The present disclosure also relates to a baffle for a silencer module of an air handling unit. The baffle includes a shell defining an interior volume of the baffle, where the shell has a panel having perforations formed therein. The baffle includes a reactive acoustic feature formed in the shell. The reactive acoustic feature includes a throat in fluid communication with an air passage external to the shell. The reactive acoustic feature also includes an attenuation profile configured to attenuate tonal acoustic waves. The baffle includes a sound absorbing material disposed within the interior volume, where the sound absorbing material is fluidly coupled to the air passage via the perforations, and where the sound absorbing material is configured to attenuate broad band acoustic waves.

The present disclosure also relates to a silencer module for an air handling unit. The silencer module includes a first baffle having a first shell defining a first interior volume of the first baffle. The first baffle includes a first panel having first perforations formed therein. The first baffle includes a first reactive acoustic feature formed in the first shell. The silencer module includes a second baffle having a second shell defining a second interior volume of the second baffle. The second shell includes a second panel having second perforations formed therein. The first panel is spaced apart from the second panel to form an air channel between the first panel and the second panel. The second baffle includes a second reactive acoustic feature formed in the second shell. The first reactive acoustic feature and the second reactive acoustic feature each comprise an attenuation profile configured to reduce propagation of tonal acoustic waves through the air channel.

BRIEF DESCRIPTION OF THE DRAWINGS

Various aspects of this disclosure may be better understood upon reading the following detailed description and upon reference to the drawings in which.

DETAILED DESCRIPTION

Figure 1:
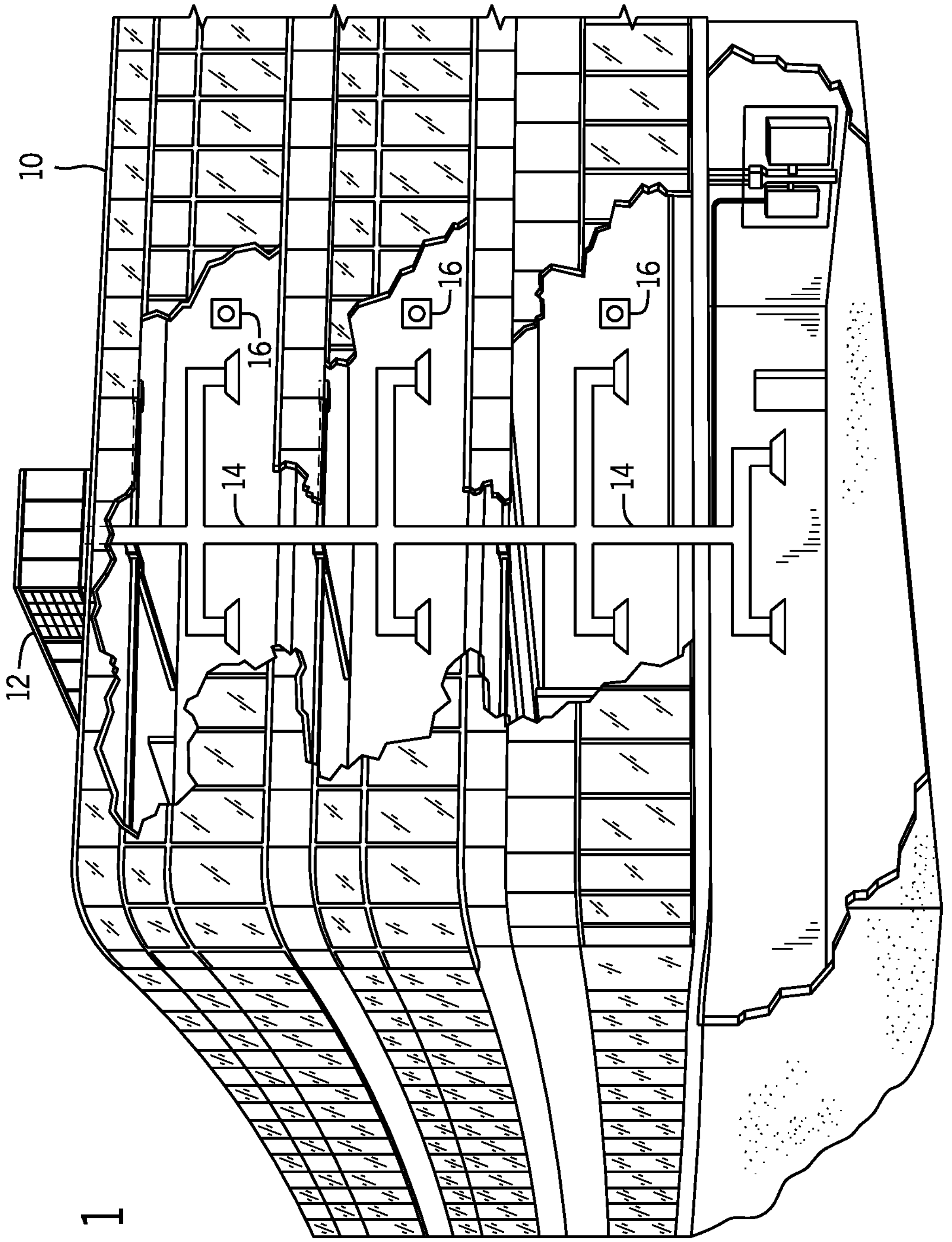
FIG. 1 is a perspective view of an embodiment of a building utilizing a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, a heating, ventilation, and/or air conditioning (HVAC) system may be used to regulate certain climate parameters within a space of a building, home, or other suitable structure. For example, the HVAC system may include an air handling unit having a fan or other flow generating device that is positioned within an enclosure of the air handling unit. The enclosure may be in fluid communication with the building or other structure via an air distribution system, such as a system of ductwork, which extends between the enclosure and the building. The fan may be operable to force an air flow along an interior of the enclosure and, thus, direct air into or out of the building and/or through the air distribution system. In particular, the fan may enable the air handling unit to exhaust return air from the building and/or to direct fresh outdoor air into the building. Accordingly, a supply of fresh air may be circulated through an interior of the building to improve or maintain an air quality within the building.

In some cases, operation of the blower and/or other climate management components of the air handling unit may generate acoustic waves, such as sound waves or audible noise, which may propagate within the air handling unit enclosure. In certain cases, the generated acoustic waves or sound waves may propagate along the enclosure and the ductwork of the HVAC system and thereby enter the building. Such audible noise may be unpleasant to occupants within the building or persons in proximity to the ductwork. Accordingly, typical air handling units may include one or more conventional in-duct silencers that are disposed within the enclosure of the air handling unit to attenuate propagation of such sound waves. That is, conventional air handling units may be equipped with in-duct silencers that are typically configured for installation within ductwork of the building and are designed to reduce propagation of sound waves through the building ductwork. Unfortunately, in-duct silencers may be ill-equipped or otherwise poorly-suited for implementation within air handling units.

For example, in-duct silencers may be unsuitable to attenuate certain frequencies of sound waves that may be generated by particular components of the air handling unit positioned within or adjacent to the air handling unit enclosure. Instead, conventional in-duct duct silencers are generally designed to attenuate relatively high frequencies of sound waves that may be generated by turbulent air flow throughout the building ductwork and/or air flow through terminal devices, such as variable-air-volume boxes, of the building ductwork. That is, in-duct silencers may be inadequate to effectively attenuate relatively low frequencies of sound waves that may be generated during operation of certain air handling unit components, such as the blower. Moreover, existing in-duct silencers may not be tunable to attenuate both tonal noises (e.g., relatively narrow frequency ranges of high energy acoustic waves) and broad band noise (e.g., relatively wide frequency ranges of low energy acoustic energy) that may be generated via operation of the air handling unit components. As a result, installation of conventional in-duct silencers within an air handling unit may reduce or limit an overall acoustic performance of the air handling unit.

It is now recognized that augmenting and/or improving silencers to effectively attenuate both tonal noise and broad band noise that may be generated during operation of the air handling unit may reduce a magnitude of sound waves propagating through the enclosure of the air handling unit. As a result, the silencers may reduce a level of sound or audible noise, such as a decibel (dB) level of acoustic noise, which may propagate from the air handling unit and into the ductwork and/or the building.

Accordingly, embodiments of the present disclosure are directed to a silencer (e.g., a silencer module, a silencer assembly) that is configured to more effectively attenuate frequencies of sound waves that may be generated during operation of certain air handling unit components. In particular, embodiments of the disclosed silencer includes one or more tunable acoustic features that are configured to facilitate attenuation of tonal frequencies (e.g., peak frequencies, resonant frequencies) and wide range frequencies (e.g., broad band noise) of acoustic waves. As an example, the silencer may include a hybrid structure that utilizes one or more reactive acoustic features, such as Helmholtz resonators and/or a quarter wave tubes, to attenuate tonal frequencies of acoustic energy that may be generated during operation of air handling unit components, and/or may include one or more absorptive acoustic features, such as noise attenuating material or a sound absorbing material (e.g., fiberglass, mineral wool, steel wool, foam, natural cotton, micro-perforated metal), to attenuate wide range frequencies (e.g., broad band noise) of acoustic energy that may be generated during operation of the air handling unit components. In some embodiments, an array of multiple silencers may be supported within a support frame to collectively form a silencer bank that may be positioned within the air handling unit to attenuate sound waves that may propagate through the air handling unit. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12, such as an air handling unit (AHU). The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit.

The HVAC unit 12 may be an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16 (e.g., processing circuitry), one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

It should be appreciated that any of the features described herein may be incorporated with the HVAC unit 12 or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, HVAC systems generally include an air distribution system, such as a system of ductwork, which extends between the HVAC system and a space to be conditioned, such as a room or zone within a building. In some cases, air flowing through the ductwork may generate audible noise that may be unpleasant or annoying to occupants within the rooms or zones of the building. Accordingly, certain HVAC systems may include an in-duct silencer or muffling device that is installed within the ductwork and is configured to attenuate the audible noise. That is, the in-duct silencers may be configured to reduce a magnitude of sound waves that are generated by air flow through the ductwork. As noted above, conventional in-duct duct silencers are generally designed to attenuate relatively high frequencies of sound waves and for use with relatively high flow rates of air. Accordingly, in-duct silencers may be ill-equipped for use within air handling units. That is, in-duct silencers may inadequately attenuate relatively low frequencies of sound waves that may be generated during operation of, for example, a blower or fan assembly of the air handling unit.

Accordingly, embodiments of the present disclosure are directed to a silencer configured to more effectively attenuate frequencies of sound waves that may be generated by components of the air handling unit (e.g., the HVAC unit 12). Indeed, embodiments of the silencer discussed herein may be configured to attenuate sound waves at a targeted frequency range that are typically generated during operation of an air handling unit, as compared to a frequency range of sound waves conventionally attenuated by in-duct silencers.

Figure 2:
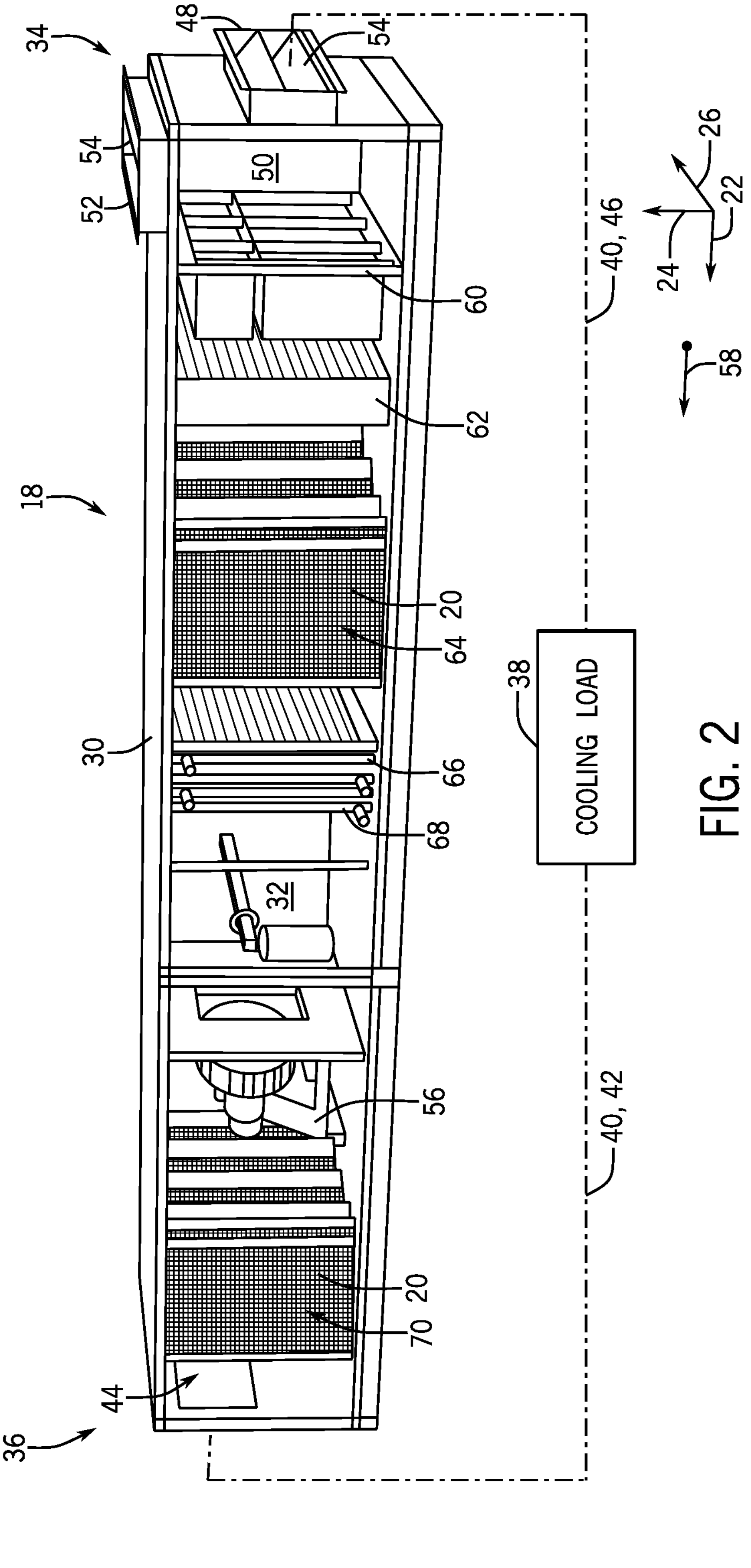
FIG. 2 is a perspective view of an embodiment of an air handling unit that may be used in an HVAC system, in accordance with an aspect of the present disclosure.

With the foregoing in mind, FIG. 2 is a perspective view of an embodiment of an air handling unit 18 that includes a pair of silencer banks 20, each having one or more silencers. It should be noted that the air handling unit 18 may include embodiments or components of the HVAC unit 12 shown in FIG. 1, a rooftop unit (RTU), or any other suitable air handling unit or HVAC system. To facilitate discussion, the air handling unit 18, the silencer banks 20, and their respective components, will be described with reference to a longitudinal axis 22, a vertical axis 24, which is oriented relative to gravity, and a lateral axis 26. As discussed below, in some embodiments, the air handling unit 18 may provide a variety of air filtration functions and heating and/or cooling functions, such as cooling, heating, heating with electric heat, cooling with hydronic heat exchangers, cooling with dehumidification, heating with gas heat, or cooling with a heat pump. Accordingly, the air handling unit 18 may circulate a flow of conditioned air through a space within the building 10 or other suitable structure.

As shown in the illustrated embodiment, the air handling unit 18 includes an enclosure 30 that forms an air flow path 32 through the air handling unit 18, which extends from an upstream end portion 34 of the air handling unit 18 to a downstream end portion 36 of the air handling unit 18. The enclosure 30 may be in fluid communication with a cooling load 38, such as the building 10, via an air distribution system, or a system of ductwork, which is represented by dashed lines 40. Particularly, the air distribution system 40 includes a supply duct 42 that is coupled to a supply air outlet 44 of the air handling unit 18 and a return duct 46 that is coupled to a return air inlet 48 of the air handling unit 18. Accordingly, the supply duct 42 and the return duct 46 may fluidly couple the air flow path 32 to the cooling load 38.

In the illustrated embodiment, the air handling unit 18 includes an inlet plenum 50 that is in fluid communication with the return air inlet 48 and an outside air inlet 52. The return air inlet 48 and the outside air inlet 52 may each include respective dampers 54 that are configured to regulate a flow rate of return air and/or a flow rate of outside air that may be drawn into the inlet plenum 50 via a fan 56 of the air handling unit 18. In particular, the fan 56 is configured to draw the return air and/or the outside air, collectively referred to herein as supply air, along the air flow path 32 in a downstream direction 58, from the upstream end portion 34 to the downstream end portion 36 of the air handling unit 18.

In some embodiments, the air handling unit 18 may include a filter rack 60 and an ionization filter 62 that are configured to filter the supply air before the fan 56 draws the supply air through a silencer bank 64 of the pair of silencer banks 20. Particularly, the filter rack 60 and the ionization filter 62 may include a plurality of filtration elements that are configured to remove airborne particulates, such as dust or pollen, from the flow of supply air. The fan 56 may draw the filtered supply air across a cooling coil 66 and a heating coil 68, which may be configured to cool and heat, respectively the flow of supply air. For example, in a cooling mode of the air handling unit 18, chilled liquid, such as chilled water, may be circulated through the cooling coil 66 while the heating coil 68 is non-operational. In this manner, the chilled liquid circulating through the cooling coil 66 may absorb thermal energy from the supply air flowing across a heat exchange area of the cooling coil 66. Conversely, in a heating mode of the air handling unit 18, a heated liquid, such as heated water, may be circulated through the heating coil 68, while the cooling coil 66 is non-operational. Accordingly, the heating coil 68 may transfer thermal energy to the flow of supply air in the heating mode of the air handling unit 18. In any case, the fan 56 may force the conditioned supply air through an additional silencer bank 70 of the pair of silencer banks 20, through the supply air outlet 44, and into the supply duct 42. In accordance with these techniques, the air handling unit 18 may regulate one or more climate parameters and/or air quality parameters within the cooling load 38.

Figure 3:
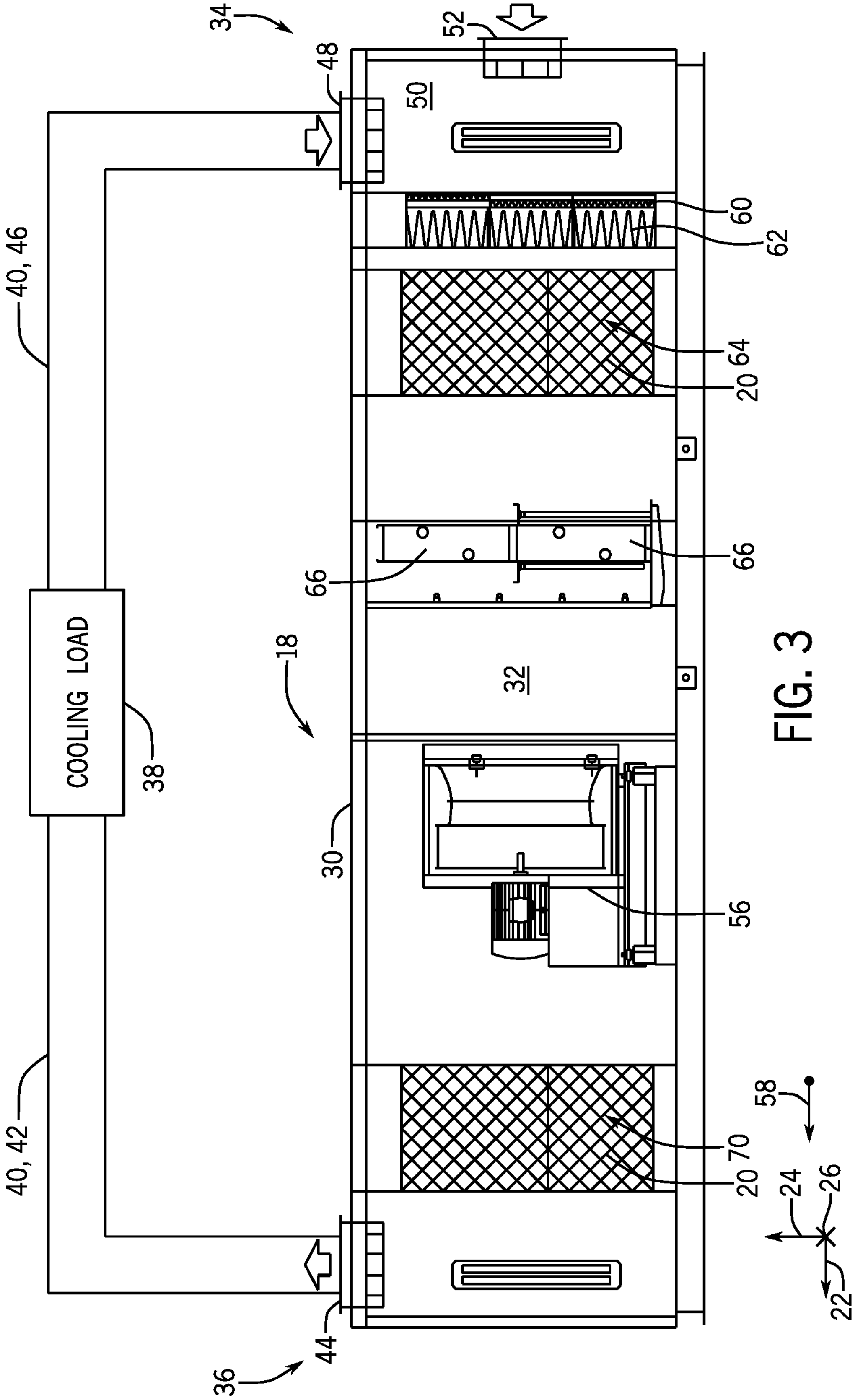
FIG. 3 is a schematic diagram of an embodiment of an air handling unit that may be used in an HVAC system, in accordance with an aspect of the present disclosure.

FIG. 3 is a schematic of an embodiment of the air handling unit 18. In the illustrated embodiment, the fan 56 is positioned between the silencer banks 20 within the enclosure 30. Particularly, the silencer bank 64 is positioned upstream of the fan 56, which respect to a direction of air flow along the enclosure 30, and the additional silencer bank 70 is positioned downstream of the fan 56, with respect to a direction of air flow along the enclosure 30. However, it should be noted that, in other embodiments, the silencer banks 20 may be positioned along any other portion(s) of the air flow path 32 within the enclosure 30. Moreover, in some embodiments, the air handling unit 18 may include one silencer bank 20 or more than two silencer banks 20, instead of the pair of silencer banks 20 shown in FIG. 3. For example, in some embodiments, the air handling unit 18 may include the silencer bank 64, which may be positioned between the fan 56 and the heating coil 68, or along another portion of the enclosure 30 that is upstream or downstream of the fan 56, with respect to a direction of air flow through the fan 56.

As noted above, operation of certain components of the air handling unit 18, such as the fan 56 and/or any other components of the air handling unit 18 positioned within or adjacent to the air flow path 32, may generate audible noise in the form of sound waves. The generated sound waves may propagate along the air flow path 32 and, in some cases, may enter the cooling load 38 as audible noise. That is, the generated audible noise may enter the cooling load 38 via the supply duct 42, the return duct 46, or both. Therefore, embodiments of the air handling unit 18 discussed herein may include the silencer bank 64 and/or the additional silencer bank 70, which may be configured to block the propagation of sound waves along the air flow path 32 and into the cooling load 38. As discussed in detail below, the silencer banks 20 may be separate components that are positioned within the enclosure 30 or may form a portion of the enclosure 30 itself. In any case, the air flow path 32 may extend across the silencer banks 20 (e.g., across individual silencers of the silencer banks 20), thereby enabling the silencer modules to attenuate sound waves that may propagate along the air flow path 32.

For clarity, it should be noted that, in some embodiments, the additional silencer bank 70 may be substantially similar to the silencer bank 64. That is, the additional silencer bank 70 may include some or all of the components of the silencer bank 64 discussed herein and may be used interchangeably with the silencer bank 64. Accordingly, for conciseness, the silencer bank 64 will be described with reference to the subsequent figures below.

Figure 4:
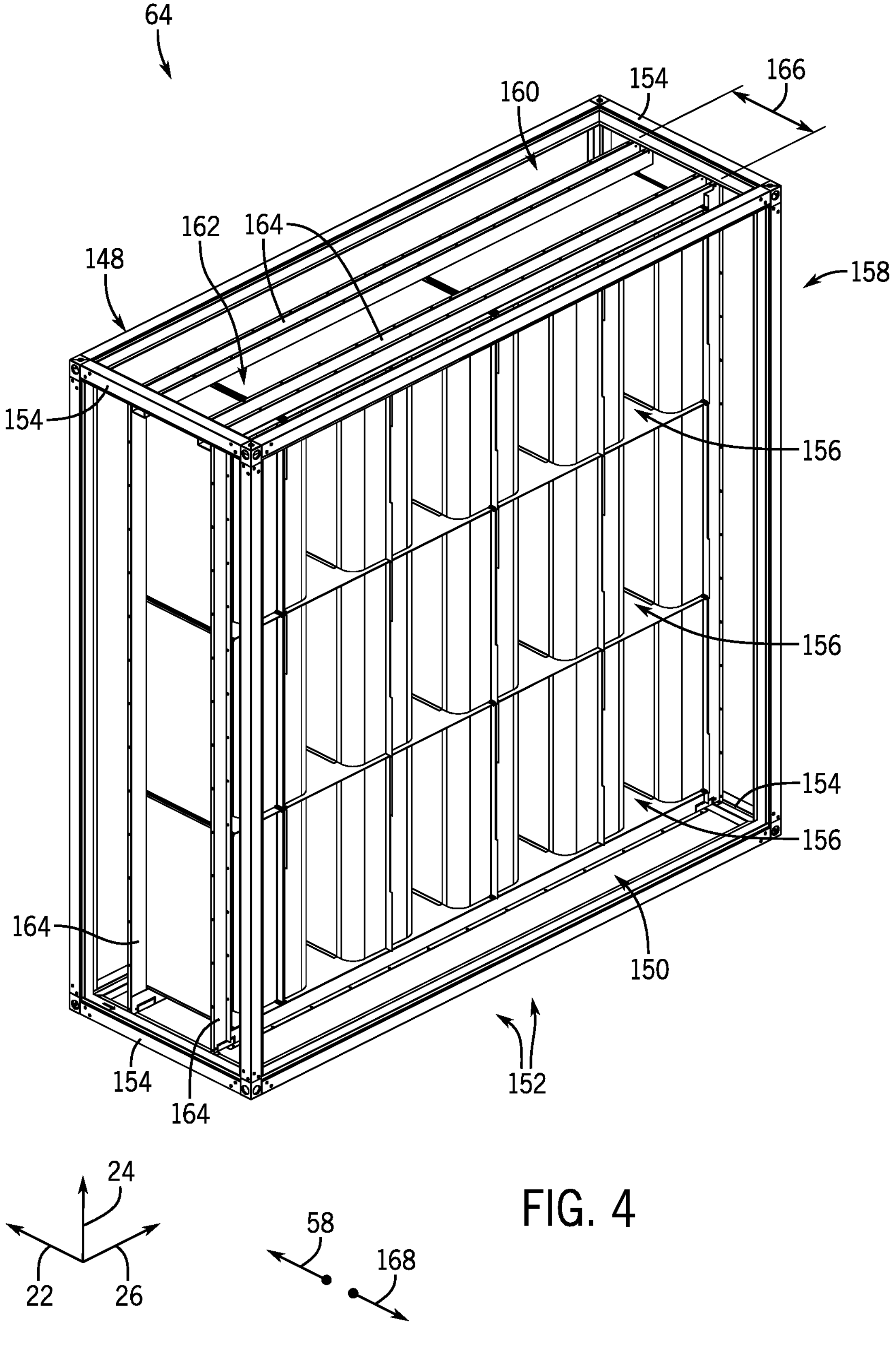
FIG. 4 is a perspective view of an embodiment of a silencer bank, in accordance with an aspect of the present disclosure.

To facilitate discussion of the silencer bank 64 and its components, FIG. 4 is a perspective view of an embodiment of the silencer bank 64. It should be noted that the following discussion with reference to FIG. 4 is intended to briefly introduce various components and subassemblies of the silencer bank 64, which will be described in further detail below. With the foregoing in mind, FIG. 4 illustrates a support frame 148 of the silencer bank 64, which may include a portion of the enclosure 30, which is configured to couple to and support a silencer bank 150. The silencer bank 150 includes a plurality of silencers 152 that, as described in detail below, are each configured to attenuate sound waves that may otherwise propagate along the air flow path 32. In some embodiments, the support frame 148 may be a component of the enclosure 30 and may therefore form a portion of the enclosure 30. For example, frame rails 154 of the support frame 148 may be configured to couple to frame rails of the enclosure 30, thereby securing the silencer bank 64 to the air handling unit 18. However, it should be noted that, in other embodiments, the support frame 148 may be a component of the air handling unit 18 that is separate from the enclosure 30. In other words, in such embodiments, the support frame 148 may not form a portion of the enclosure 30 itself and, instead, may be positioned within an interior of the enclosure 30.

In any case, as shown in the illustrated embodiment, the silencers 152 may define a plurality of air flow paths, referred to herein as air gaps 156 (e.g., air channels), which extend through the silencer bank 150 from respective first end portions 158 of the silencers 152 to respective second end portions 160 of the silencers 152. Accordingly, the air gaps 156 form a portion of the air flow path 32 that extends across the silencer bank 64. As discussed below, one or more panels of the enclosure 30 may be coupled to the support frame 148 and may be configured to encompass or surround an outer perimeter 162 of the silencer bank 150. The silencer bank 64 may include blank-off panels 164 that extend between the panels of the enclosure 30 and the outer perimeter 162 of the silencer bank 150 to block air flow between the panels and the silencer bank 150. Accordingly, the fan 56 may direct substantially all air flowing along the air flow path 32 through the air gaps 156 of the silencers 152. That is, the blank-off panels 164 may substantially block air flow from bypassing the silencers 152 by flowing between the silencer bank 150 and the panels of the enclosure 30.

As discussed in detail herein, the silencers 152 may each include one or more reactive acoustic features (e.g., Helmholtz resonators, quarter wave tubes) and one or more absorptive acoustic features (e.g., sound absorbing material) configured to mitigate the propagation of sound waves across the silencer bank 150. That is, the reactive and absorptive acoustic features may cooperate to impede the propagation of sound waves through the air gaps 156 from the first end portions 158 of the silencers 152 to the second end portions 160 of the silencers 152, or vice versa. As discussed in detail below, the air gaps 156 may be sized to allow relatively unimpeded air flow across the silencer bank 150 while maintaining a desired acoustic performance of the silencer bank 64. For clarity, as used herein, "acoustic performance" refers to an ability of the silencer bank 150 (and/or the individual silencers 152) to attenuate particular frequencies of sound waves that may otherwise propagate across the silencer bank 150. That is, the "acoustic performance" of the silencer bank 64 may refer to the ability of the silencer bank 150 to diminish an amplitude of certain frequencies of sound waves and impede propagation of these frequencies of sound waves across a depth 166 of the silencer bank 150 in the downstream direction 58, in an upstream direction 168, opposite the downstream direction 58, or both.

In some embodiments, the silencer bank 150 may be configured to more effectively attenuate sound waves irrespective of a direction of air flow across the silencer bank 150. That is, the silencer bank 150 may be bi-directional, such that the silencer bank 150 may receive an air flow passing in the downstream direction 58 or the upstream direction 168, and the acoustic performance of the silencer bank 64 may be similar regardless of whether the air flow traverses the silencer bank 150 in the downstream direction 58 or the upstream direction 168.

Figure 5:
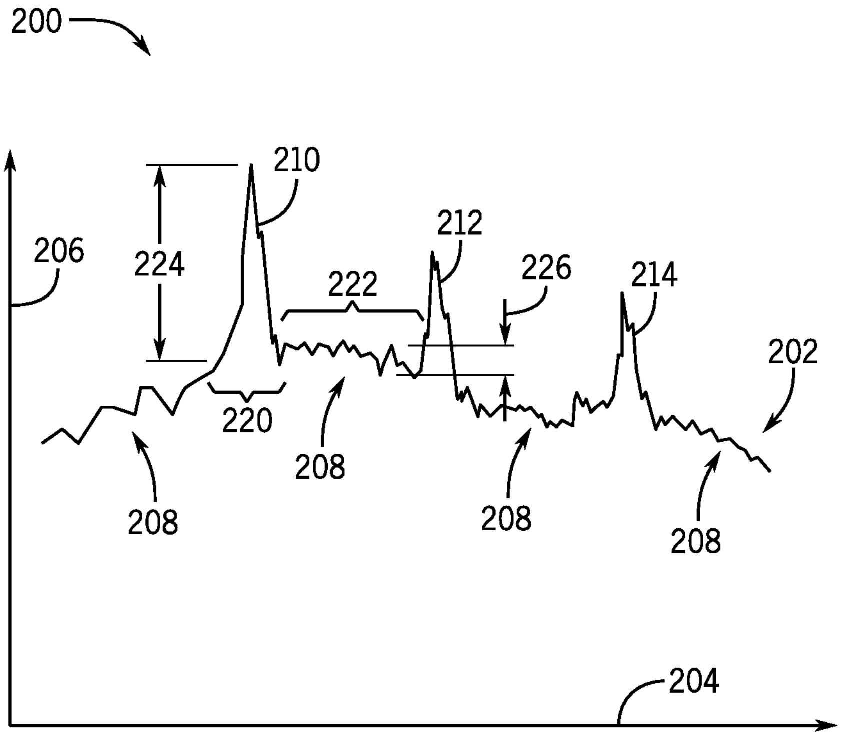
FIG. 5 is a graph of an embodiment of an operating noise profile of an air handling unit, in accordance with an aspect of the present disclosure.

As discussed above, operation of one or more components of the air handling unit 18 may generate both tonal noise and broad band noise. For example, to better illustrate the frequencies and corresponding intensities of sound (e.g., acoustic waves or acoustic energy) that may be generated during operation of the air handling unit 18, FIG. 5 is an embodiment of a graph 200 of illustrating a frequency distribution of acoustic sound that may be measurable (e.g., via a sensor) along a location (e.g., a supply air output plenum) of the air handling unit 18. That is, the graph 200 may illustrate relative frequencies and magnitudes of an audible noise profile 202 that may be generated during operation of the air handling unit 18. In the illustrated embodiment, an 'x'-axis 204 of the graph 200 may illustrate a frequency of acoustic sound (e.g., measured in Hertz [Hz]) and a 'y'-axis 206 of the graph 200 may illustrate a corresponding sound pressure level (e.g., measured in decibels [dB]).

The audible noise profile 202 may include broad band noise 208 (e.g., wideband noise) may be indicative of acoustic waves (e.g., noise) that are distributed across a wide range of frequencies. Such broad band noise 208 may be generated via multiple sources or components of the air handling unit 18, such as electric motors, pressurized air moving through ductwork, operation of dampers, and/or air flow across filter assemblies or other components of the air handling unit 18. Operation of the air handling unit 18 may also generate tonal noise, as represented by peaks 210, 212, and 214 of the audible noise profile 202, which may be indicative of relatively high levels (e.g., intensities) of acoustic waves that are generated within a narrow range of frequencies. As an example, one source of tonal noise within the air handling unit 18 may originate from operation of blades of the fan 56 or blades of other fans in the air handling unit 18. In particular, rotation of the fan 56 at one or more constant speeds may create acoustic waves at a blade pass frequency (BPF), where such acoustic waves are amplified (e.g., greater in magnitude) with respect to other acoustic waves included in the spectrum of the audible noise profile 202. As such, the acoustic waves may define distinguished peaks 210, 212, and 214 with respect to other sounds waves generated during operation of the air handling unit 18 (e.g., with respect to the broad band noise 208).

As an example, the blade pass frequency of the fan 56 may be determined via Equation I (Eq. I) below, where 'n' represents a quantity of fan blades included in the fan 56 and 'rpm' represents a rotational speed of the fan 56 in revolutions per minute.

$$BPF = \frac{n \times rpm}{60} \quad \text{(Eq. I)}$$

Operation of the fan 56 at the blade pass frequency may generate a peak in a magnitude of acoustic waves, such as the peak 210, at the corresponding frequency. In some cases, operation of the fan 56 at or near the blade pass frequency may also generate additional peaks in acoustic waves at harmonic frequencies, such as the peaks 212 and 214. As such, in certain cases, given known design parameters of the fan 56 (e.g., the number of blades included on the fan 56) and known the operational speed(s) of the fan 56, magnitudes and/or frequencies of certain acoustic waves that may be generated during operation of the fan 56 may be calculated or predicted.

In some cases, software may be used to simulate the manner in which ductwork and/or other HVAC components of the air handling unit 18 may affect propagation of acoustic waves throughout the air handling unit 18. In this way, expected distribution of acoustic waves at a point within the air handling unit 18, near a diffuser configured to direct air into a space of the building 10, and/or at another suitable location may be predicted. It should be understood that any one or combination of the aforementioned techniques may be implemented to facilitate generation of the graph 200 for a particular HVAC unit, such as the air handling unit 18.

For clarity, as used herein, "broad band noise 208" or "broad band acoustic waves" may refer to relatively wide frequency clusters of acoustic waves having a relatively low magnitudes (e.g., sound pressure levels, as measured in dB). As used herein, "tonal noise" or "tonal acoustic waves" may refer to relatively narrow frequency clusters of acoustic waves having relatively high magnitudes (e.g., sound pressure levels, as measured in dB). For example, as seen in the graph 200, a first frequency range 220 of the peak 210 (e.g., corresponding to tonal noise) may be less than a second frequency range 222 of a portion of the broad band noise 208. Moreover, a first magnitude 224 (e.g., overall magnitude, average magnitude) of the first peak 210 may be greater than a second magnitude 226 (e.g., overall magnitude, average magnitude) of the portion of the broad band noise 208 along the second frequency range 222.

Figure 6:
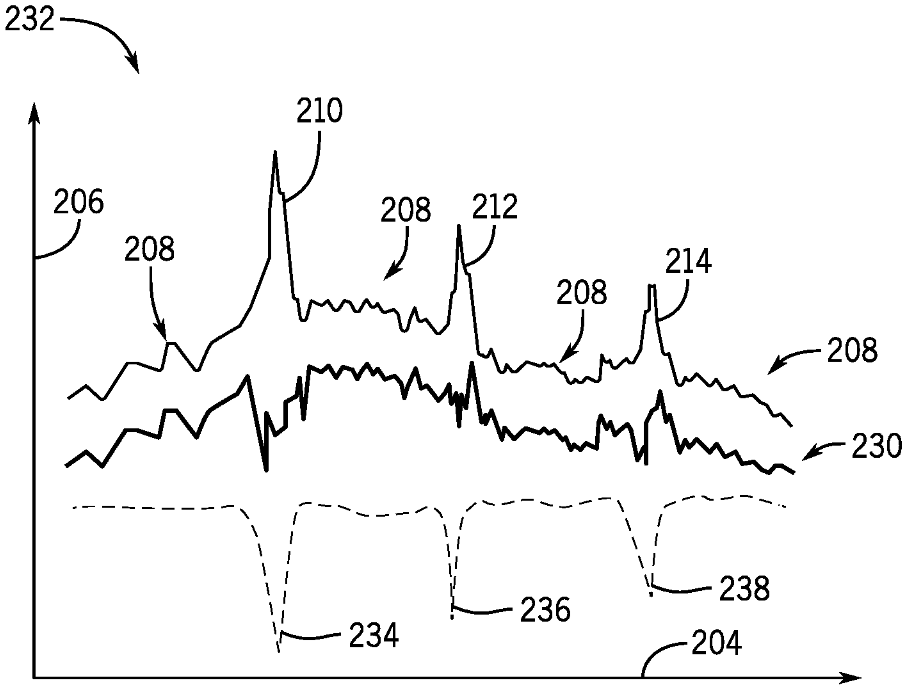
FIG. 6 is a graph of an embodiment of an attenuated operating noise profile of an air handling unit, in accordance with an aspect of the present disclosure.

In certain cases, audible noise corresponding to the peaks 210, 212, and 214 may be particularly noticeable (e.g., audible) by occupants of the building 10 and/or other persons that may be located near the air handling unit 18. Accordingly, the silencer bank 150 and/or the individual silencers 152 may be configured (e.g., tuned, customized, designed, tailored, configured) to attenuate acoustic waves associated with the peaks 210, 212, and 214, amongst other acoustic noise (e.g., broad band noise 208), to reduce (e.g., substantially reduce) audible noise that may be output during operation of the air handling unit 18. As such, via attenuation of the peaks 210, 212, and 214, as well as attenuation of the broad band noise 208, the silencers 152 may facilitate generation of an attenuated operating noise profile 230 (see FIG. 6) during operation of the air handling unit 18, which may be more pleasant to occupants than the audible noise profile 202. To facilitate the following discussion, FIG. 6 is another embodiment of the graph 200, referred to herein as a graph 232, which illustrates the attenuated audible noise profile 202 that may be generated by the air handling unit 18 when equipped with one or more of the silencers 152.

As discussed in detail below, each of the silencers 152 may include one or more reactive (e.g., tunable) acoustic features or structures configured to reduce propagation of tonal noise (e.g., the peaks 210, 212, and 214) across the silencer 152 and may include one or more absorptive acoustic features or structures configured to reduce propagation of the broad band noise 208 across the silencer 152. For example, the reactive acoustic features may be designed, configured, and/or otherwise tuned to create attenuation troughs 234, 236, and/or 238 that may coincide with the frequencies of tonal noises at the peaks 210, 212, and 214 to counteract such frequencies. The absorptive acoustic features may include sound absorptive material that is designed, configured, and/or tuned to mitigate or reduce an amplitude of frequencies of acoustic energy included in the broad band noise 208. As such, the reactive acoustic features and the absorptive acoustic features of the silencers 152 may cooperate to facilitate generation of the attenuated operating noise profile 230 during operation of the air handling unit 18, which may be more pleasant to occupants than the audible noise profile 202.

Figure 7:
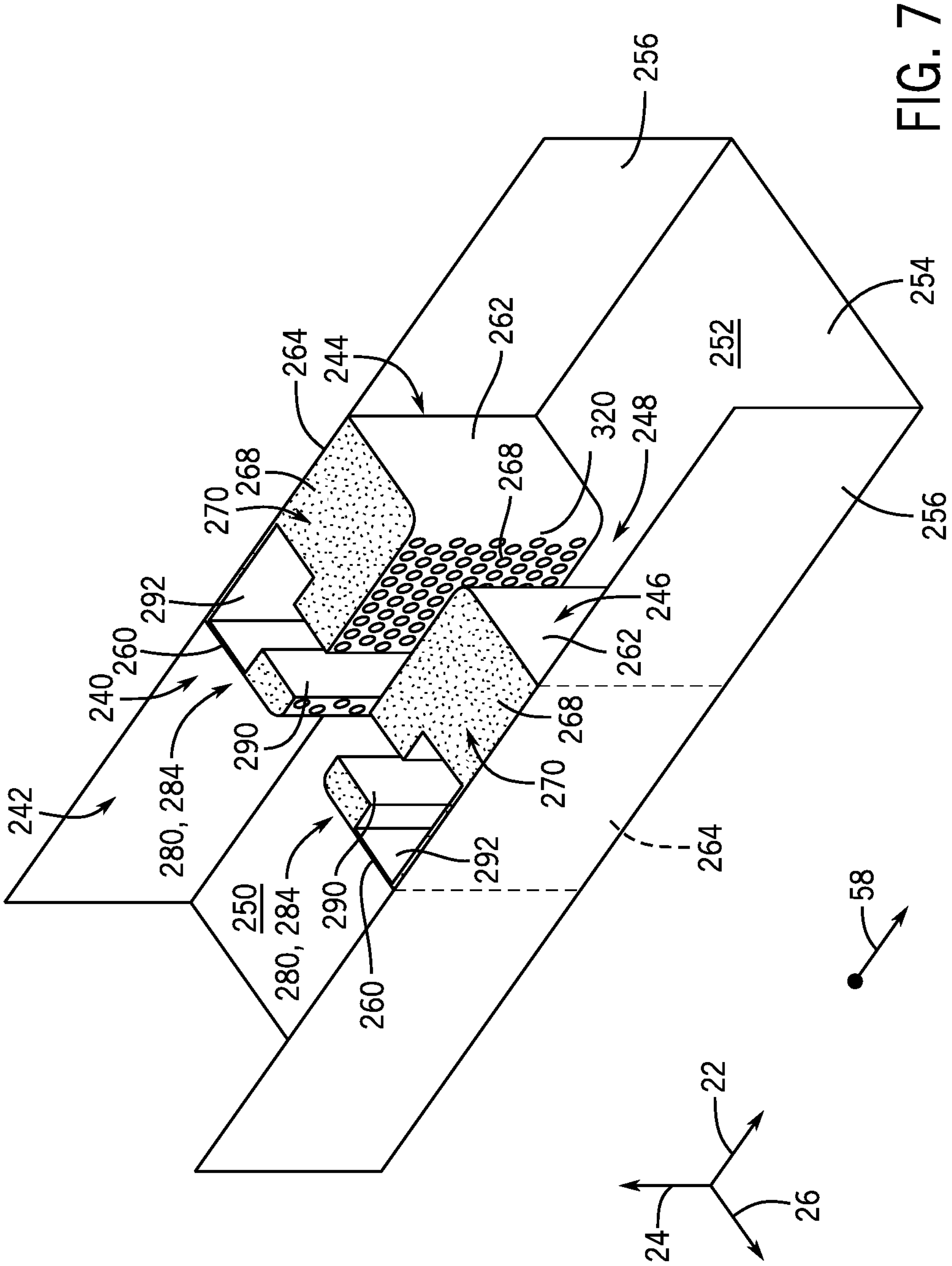
FIG. 7 is a perspective view of an embodiment of a silencer module, in accordance with an aspect of the present disclosure.

With the foregoing in mind, FIG. 7 is a perspective view of an embodiment of a silencer module 240 (e.g., one of the silencers 152), also referred to herein as a silencer, illustrating the silencer module 240 disposed within a chamber 242 (e.g., a channel, a conduit, a housing). In the illustrated embodiment, the silencer module 240 includes a first baffle 244 and a second baffle 246 that are spaced apart from one another to form an air channel 248 (e.g., a region, space, flow path) between the first baffle 244 and the second baffle 246. In some embodiments, the chamber 242 is configured to receive an air flow from a component (e.g., the fan 56) of the air handling unit 18. For example, the chamber 242 may include an upstream portion 250 that is fluidly coupled the fan 56 and a downstream portion 252 that is fluidly coupled to the supply duct 42. Accordingly, the fan 56 may direct an air flow through the upstream portion 250, the air channel 248, the downstream portion 252, and toward the supply duct 42 in the downstream direction 58. The chamber 242 may include a bottom wall 254 (e.g., a first wall), side walls 256, and a top wall (e.g., a second wall). To better illustrate the silencer module 240, the top wall is omitted from the illustrated embodiment of the chamber 242. While the silencer module 240 is positioned in the chamber 242 in the illustrated embodiment of FIG. 7, it should be understood that, in other embodiments, the silencer module 240 may not be disposed within the chamber 242. For example, the silencer module 240 may instead be disposed in the silencer bank 64 as one of the plurality of silencers 152.

In any case, the first and second baffles 244, 246 may each include first panels 260 (e.g., upstream panels, walls), second panels 262 (e.g., downstream panels, walls), outer panels 264 (e.g., walls) extending between the first and second panels 260, 262, and inner panels 268 (e.g., walls) extending between the first and second panels 260, 262. In some embodiments, the outer panels 264 may form a portion of the side walls 256 of the chamber 242. The first and second baffles 244, 246 include top panels 268 and bottom panels that, together with the first panels 260, the second panels 262, the outer panels 264, and the inner panels 268 may bound respective interior volumes 270 of the baffles 244, 246. The top panels 268, the bottom panels, the first panels 260, the second panels 262, the outer panels 264, and the inner panels 268 may form respective shells or housings of the baffles 244, 246.

Figure 8:
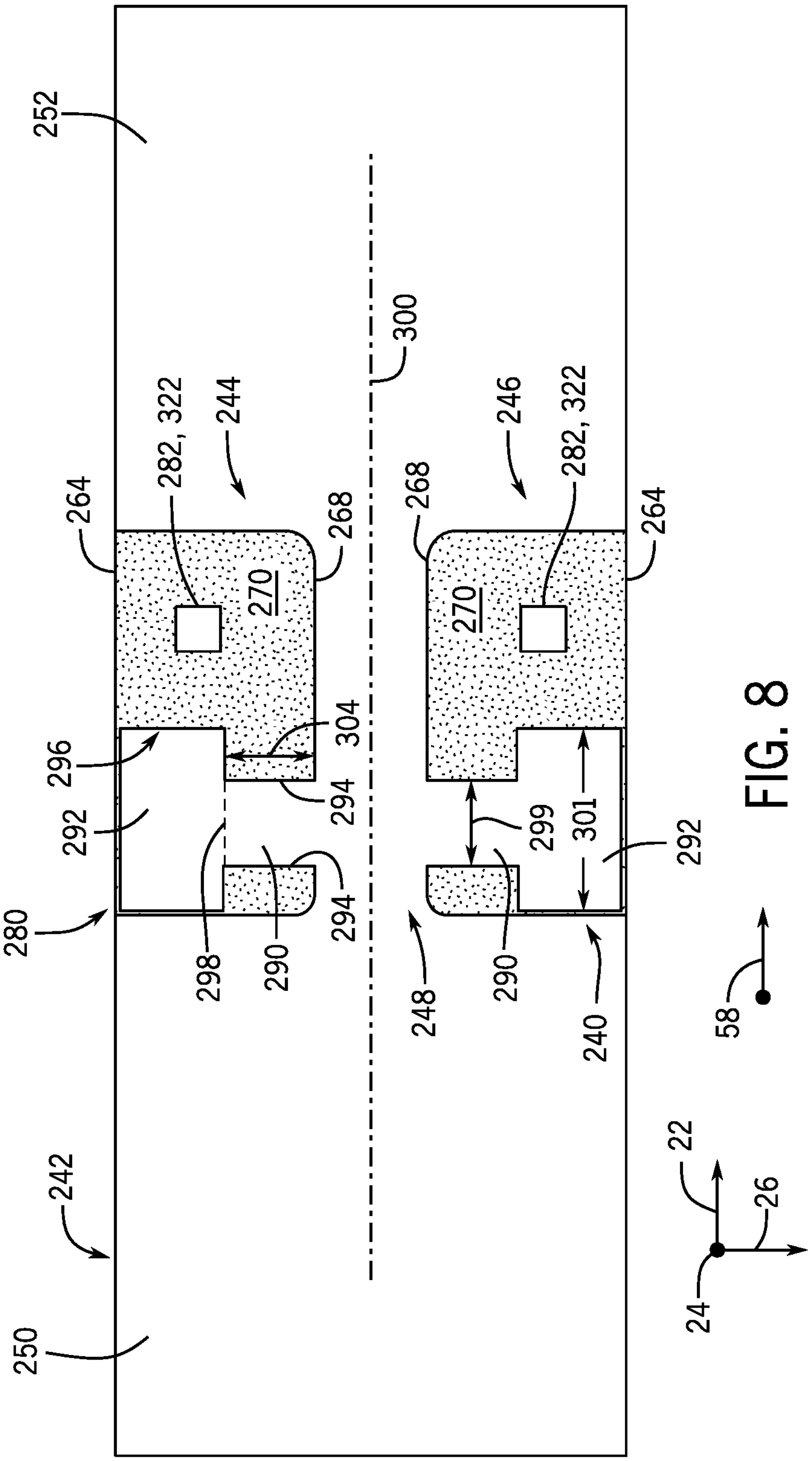
FIG. 8 is a cross-sectional top view of an embodiment of a silencer module, in accordance with an aspect of the present disclosure.

The silencer module 240 may include one or more reactive acoustic features 280 and/or one or more absorptive acoustic features 282 that are configured to attenuate sound waves in accordance with the techniques discussed herein. For example, in some embodiments, the reactive acoustic features 280 may include resonators 284 (e.g., Helmholtz resonators) that are formed within the first and second baffles 244, 246. To better illustrate the reactive acoustic features 280 and the absorptive acoustic features 282, FIG. 8 is a cross-sectional top view of the silencer module 240. FIGS. 7 and 8 will be discussed concurrently below.

The resonators 284 may each include a throat 290 (e.g., passage, flow path) and a resonator chamber 292 that are formed in the corresponding baffles 244, 246. The throats 290 may be defined between throat walls 294 that extend from the inner panels 268 toward the outer panels 264. The resonator chamber 292 may by defined between resonator walls 296 that may define perimeters of the resonator chamber 292. As such, interfaces 298 (e.g., imaginary lines) may define respective boundaries between the throats 290 and the resonator chamber 292. Widths 299 of the throats 290 (e.g., along an axis 300 extending along the air channel 248) may be less than widths 301 of the resonator chambers 292 (e.g., along the axis 300). The throat walls 294 may include lengths 304 that extend from the inner panels 268 to a corresponding set of the resonator walls 296 (e.g., to the interfaces 298). The resonators 284 may be configurable (e.g., tunable) to attenuate particular frequencies of acoustic waves that may pass through the air channel 248 (e.g., in the downstream direction 58). That is, the resonators 284 may be configured to reduce, mitigate, or substantially inhibit traversal of certain frequencies of acoustic waves (e.g., tonal noise, frequencies corresponding to the peaks 210, 212, and/or 214) through the air channel 248 from the upstream chamber 242 to the downstream chamber 242.

For example, the resonators 284 may be designed to have an attenuation frequency (e.g., a target attenuation frequency) that may correspond to frequencies of one or more of the peaks 210, 212, and 214 and, therefore, enable the resonators 284 to attenuate the peaks 210, 212, and/or 214. The attenuation frequency of a resonator 284 may be determined via Equation II (Eq. II) below, where 'c' represents the speed of sound, 'A' represents the cross-sectional area of the throat 290, '$l_e$' represents the length of the throat 290 (e.g., one of the lengths 304), and 'V' represents the volume of the resonator chamber 292. For clarity, it should be understood that the cross-sectional area of the throat 290 may be calculated based a height of the throat 290 (e.g., extending along the vertical axis 24) and a width of the throat 290 (e.g., extending along the longitudinal axis 22).

$$f = \frac{c}{2\pi}\sqrt{\frac{A}{Vl_e}} \qquad \text{(Eq. II)}$$

In accordance with Eq. II above, parameters of the resonators 284 may be adjusted to include desired attenuation frequencies. As such, the resonators 284 may be tuned to enable the silencer module 240 to more effectively attenuate tonal noise (e.g., the peaks 210, 212, and/or 214). That is, the resonators 284 may facilitate mitigating or diminishing an amplitude of sound waves that may be reemitted from the resonators 284 (e.g., upon entry into the resonators 284) and propagated back into air channel 248. In some embodiments, the attenuation frequencies of each of the resonators 284 may be the same (e.g., within a threshold percentage of one another). In other embodiments, resonators 284 may be configured to have different attenuation frequencies. For example, one of the resonators 284 may be configured to have a relatively high attenuation frequency, whereas another of the resonators 284 may be configured to have a relatively low attenuation frequency.

The first and second baffles 244, 246 may include perforations 320 that are configured to fluidly couple the interior volumes 270 of the first and second baffles 244, 246 to an environment (e.g., the air channel 248) surrounding the first and second baffles 244, 246. For example, the perforations 320 maybe formed in the inner panels 268, the first panels 260, the second panels 262, or a combination thereof. That is, the perforations 320 may be formed in a perforated plate (e.g., one or more of the inner panels 268, the first panels 260, and/or the second panels 262). In any case, the perforations 320 may enable acoustic waves (e.g., sound waves traveling in the downstream direction 58 through the air channel 248) to enter the interior volumes 270. In this manner, the interior volumes 270 may facilitate attenuation of such sound waves. In particular, the interior volumes 270 may more effectively attenuate broad band noise. In certain embodiments, the interior volumes 270 may house a sound absorbing material 322, such as fiberglass, mineral wool, steel wool, foam, natural cotton, micro perforated metal, or another suitable material, which may enhance an ability of the interior volumes 270 to attenuate sound waves (e.g., broad band noise) that may enter the interior volumes 270 via the perforations 320. In other words, the sound absorbing material 322 may facilitate mitigating or diminishing an amplitude of sound waves that may be reemitted from the interior volumes 270 (e.g., upon entry into the interior volumes 270) and propagated back into air channel 248. The perforations 320, the interior volumes 270, the sound absorbing material 322, or any combination thereof, may form the absorptive acoustic features 282 of the silencer module 240. It should be understood that, in accordance with the techniques discussed above, the reactive acoustic features 280 (e.g., the resonators 284) and the absorptive acoustic features 282 (e.g., the perforations 320, the interior volumes 270, and/or the sound absorbing material 322) may cooperate to enable the silencer module 240 to more effectively attenuate both tonal noise and broad band noise that may be generated from one or more components of the air handling unit 18.

Although the illustrated embodiments of the silencer module 240 shown in FIGS. 7 and 8 include two baffles (e.g., the first baffle 244 and the second baffle 246), it should be understood that, in other embodiments, the silencer module 240 may include a single baffle (e.g., either of the first or second baffles 244 or 246). Further, as discussed below, certain embodiments, of the silencer module 240 may include more than two baffles. For example, the silencer module 240 may include 3, 4, 5, 6 or more than six baffles.

Figure 9:
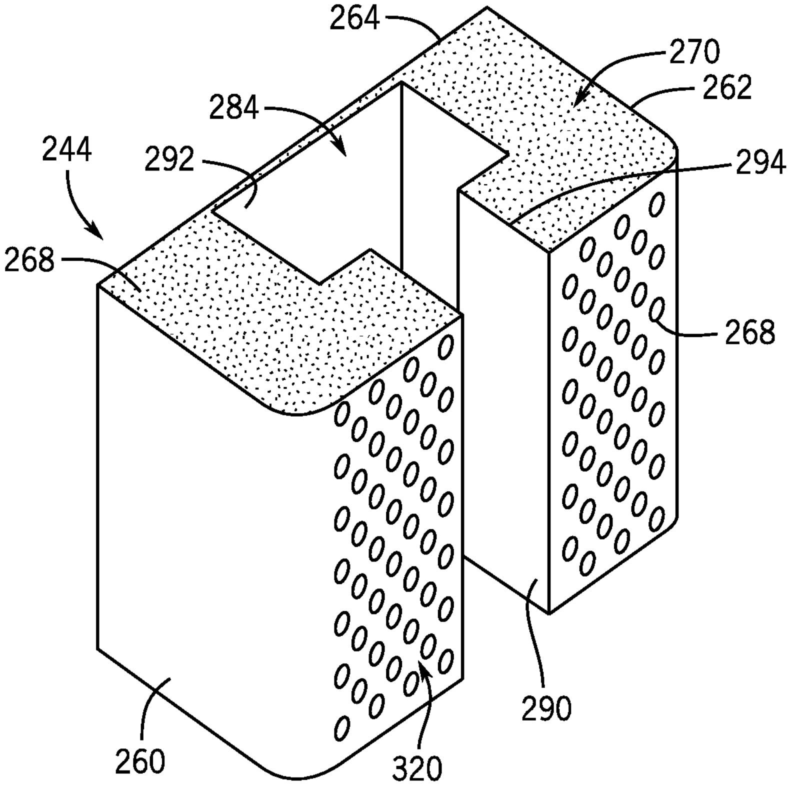
FIG. 9 is a perspective view of an embodiment of a baffle for a silencer module, in accordance with an aspect of the present disclosure.
Figure 10:
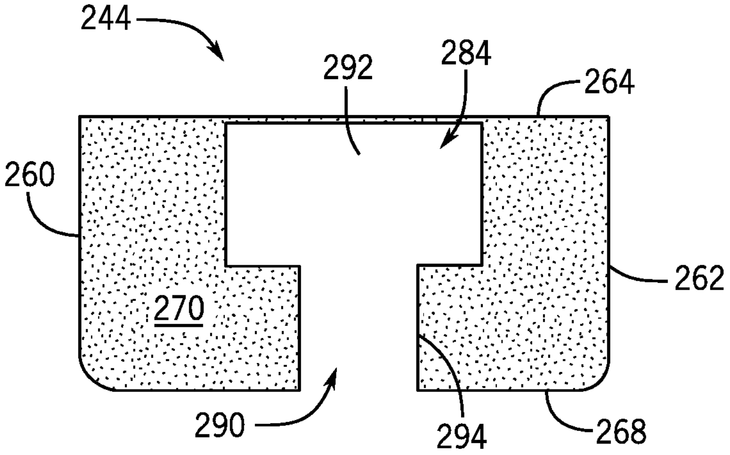
FIG. 10 is a cross-sectional top view of an embodiment of a baffle for a silencer module, in accordance with an aspect of the present disclosure.

FIG. 9 is a perspective view of an embodiment of the first baffle 244. FIG. 10 is a cross-sectional top view of an embodiment of the first baffle 244. FIGS. 9 and 10 will be discussed concurrently below. It should be understood that the second baffle 246 may include a portion of or all of the features of the first baffle 244 discussed below. In the illustrated embodiment, the inner panel 268 includes the perforations 320 formed therein. In some embodiments, the first panel 260 and the second panel 262 may be continuous sheets of material that do not include perforations formed therein. Indeed, it should be appreciated that, in certain embodiments, the first panel 260, the inner panel 268, and/or the second panel 262 may be continuous sheets of sound absorbing material that do not include the perforations 320. In such embodiments, the interior volume 270 of the first baffle 244 may be fluidly isolated from a surrounding environment (e.g., the air channel 248). In other embodiments, the first panel 260, the second panel 262, and the inner panel 268 may each include the perforations 320. In certain embodiments, the first panel 260, the inner panel 268, and/or the second panel 262 may include protrusions formed thereon and/or recesses formed therein to reflect or otherwise attenuate acoustic waves that may propagate along the air channel 248, for example.

Figure 11:
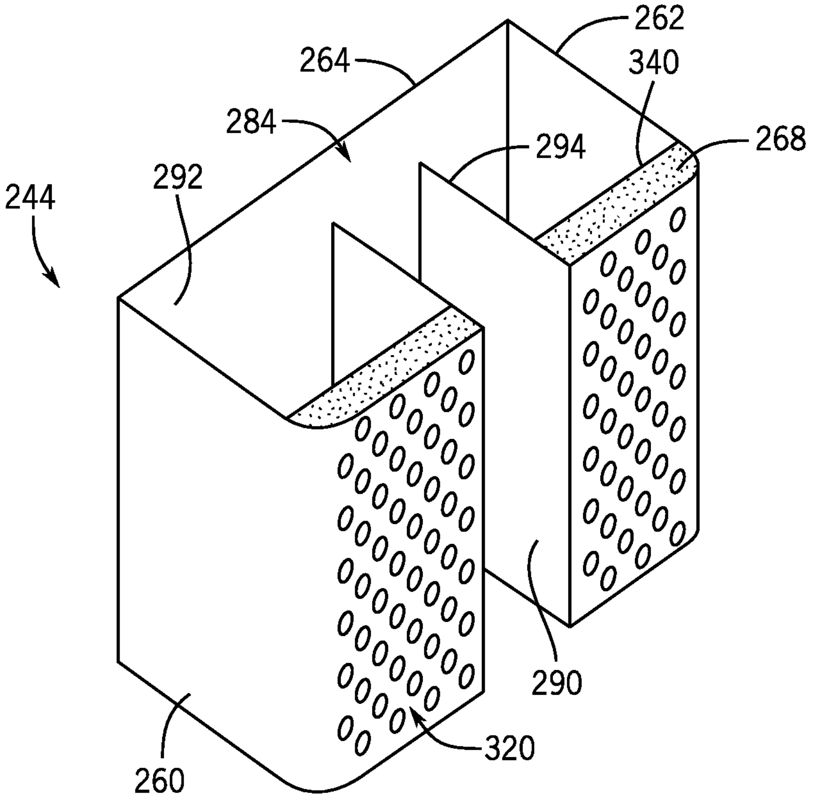
FIG. 11 is a perspective view of an embodiment of a baffle for a silencer module, in accordance with an aspect of the present disclosure.
Figure 12:
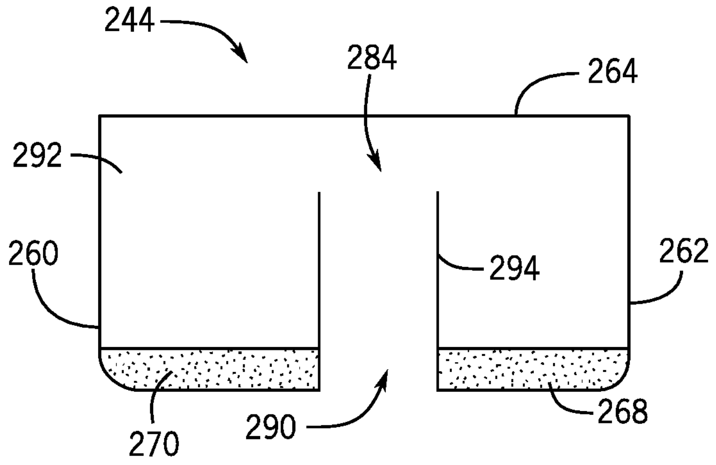
FIG. 12 is a cross-sectional top view of an embodiment of a baffle for a silencer module, in accordance with an aspect of the present disclosure.

FIG. 11 is a perspective view of an embodiment of the first baffle 244, illustrating the resonator 284 having an increased volume as compared to the resonator 284 shown in FIG. 9. FIG. 12 is a cross-sectional top view of an embodiment of the first baffle 244 of FIG. 11. FIGS. 11 and 12 will be discussed concurrently below. It should be understood that the second baffle 246 may include a portion of or all of the features of the first baffle 244 discussed below. The first baffle may include partition walls 340 that separate the resonator chamber 292 from the interior volume 270 of the first baffle 244. In some embodiments, the partition walls 340 may include continuous pieces of material that do not include perforations (e.g., openings, apertures) formed therein. In other embodiments, either or both of the partition walls 340 may include one or more perforations formed therein to facilitate transfer of acoustic waves from the resonator chamber 292 to the interior volume 270, for example.

Figure 13:
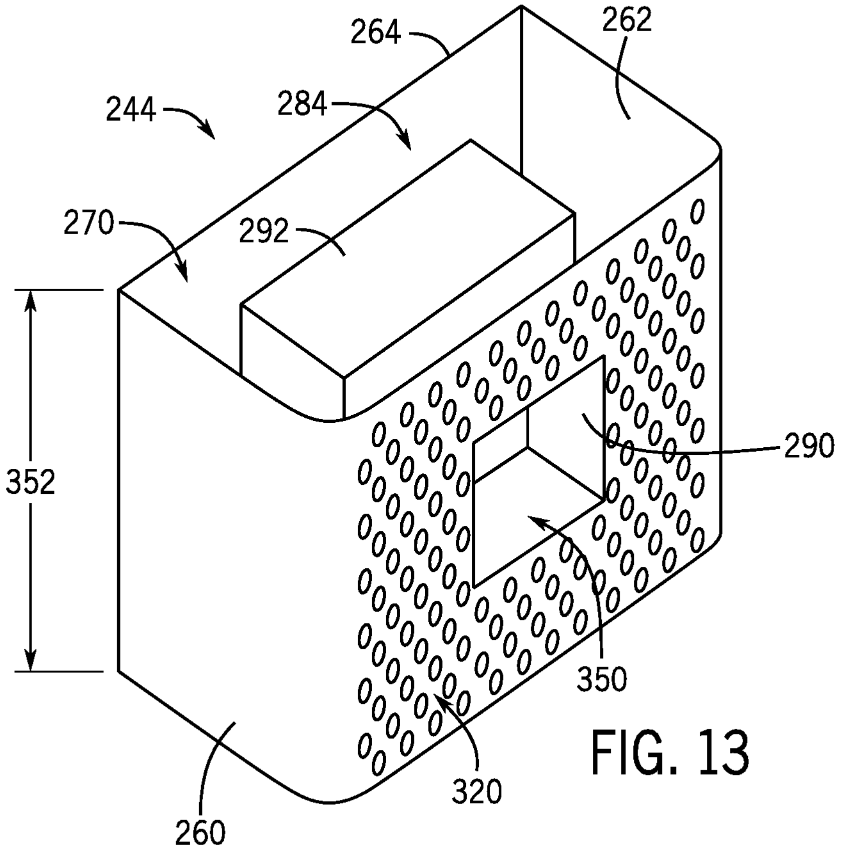
FIG. 13 is a perspective view of an embodiment of a baffle for a silencer module, in accordance with an aspect of the present disclosure.
Figure 14:
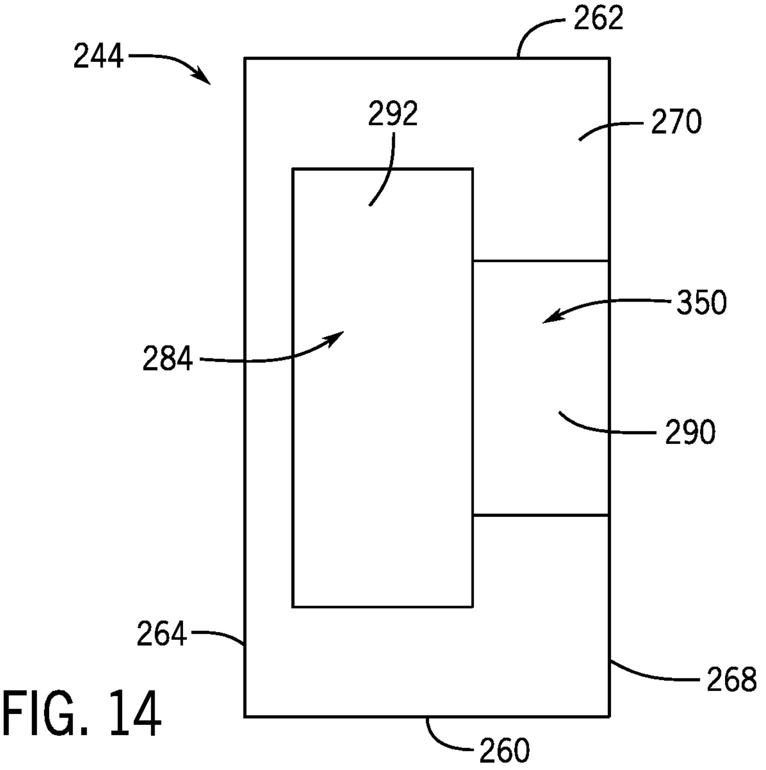
FIG. 14 is a cross-sectional top view of an embodiment of a baffle for a silencer module, in accordance with an aspect of the present disclosure.

FIG. 13 is a perspective view of an embodiment of the first baffle 244, illustrating a resonator 284 having an entry aperture 350. FIG. 14 is a cross-sectional top view of an embodiment of the first baffle 244 shown in FIG. 13. FIGS. 13 and 14 will be discussed concurrently below. In some embodiments, the throat 290 of the resonator 284 may extend across a portion of a height 352 of the first baffle 244. As such, the throat 290 may include an entry aperture 350 that may be circumscribed by portions of the inner panel 268. Although the entry aperture 350 is shown as having a quadrilateral cross-sectional geometry in the illustrated embodiment of FIG. 13, in other embodiments, the entry aperture 350 may include a circular cross-sectional geometry, a triangular cross-sectional geometry, a diamond-shaped cross-sectional geometry, or another suitable cross-sectional geometry.

In certain embodiments, the resonator chamber 292 may extend along substantially all of the height of the first baffle 244. In other embodiments, a chamber height of the resonator chamber 292 may extend along a portion of the height 352 (e.g., less than 80 percent of the height 352) of the first baffle 244. Although the resonator chamber 292 is illustrated as quadrilateral prism in the illustrate embodiment of FIG. 13, in other embodiments, the resonator chamber 292 may include another suitable three dimensional shape (e.g., a spherical shape).

Figure 15:
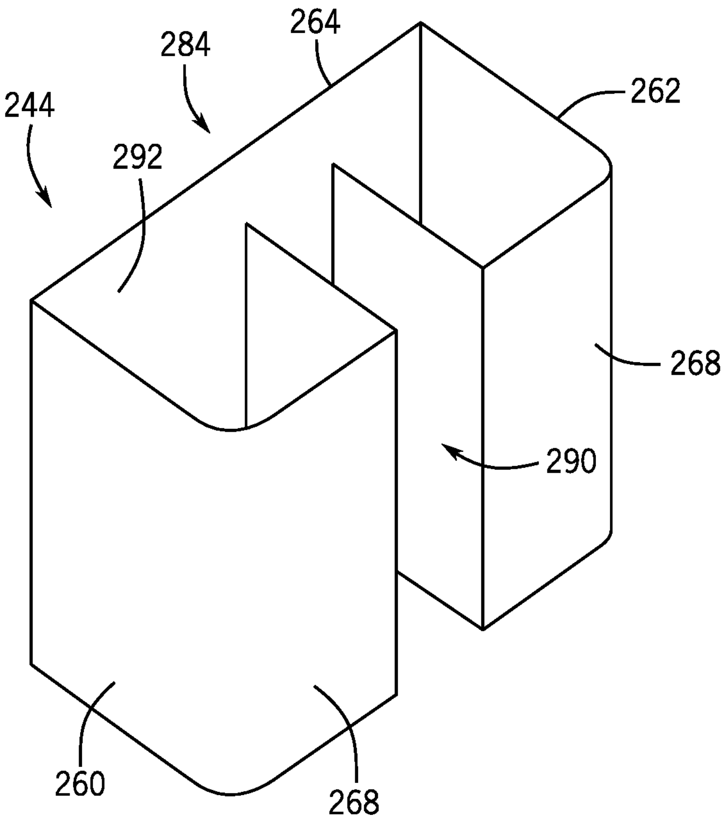
FIG. 15 is a perspective view of an embodiment of a baffle for a silencer module, in accordance with an aspect of the present disclosure.
Figure 16:
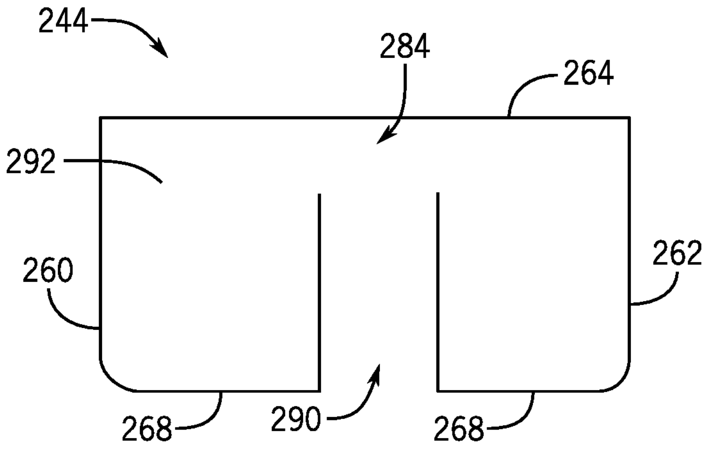
FIG. 16 is a cross-sectional top view of an embodiment of a baffle for a silencer module, in accordance with an aspect of the present disclosure.

FIG. 15 is a perspective view of an embodiment of the first baffle 244, in which the first baffle 244 does not include the perforations 320. FIG. 16 is a cross-sectional top view of an embodiment of the first baffle 244 shown in FIG. 15. As shown in the illustrated embodiments of FIGS. 15 and 16, the resonator 284 may occupy substantially all of an interior volume of the first baffle 244.

Figure 17:
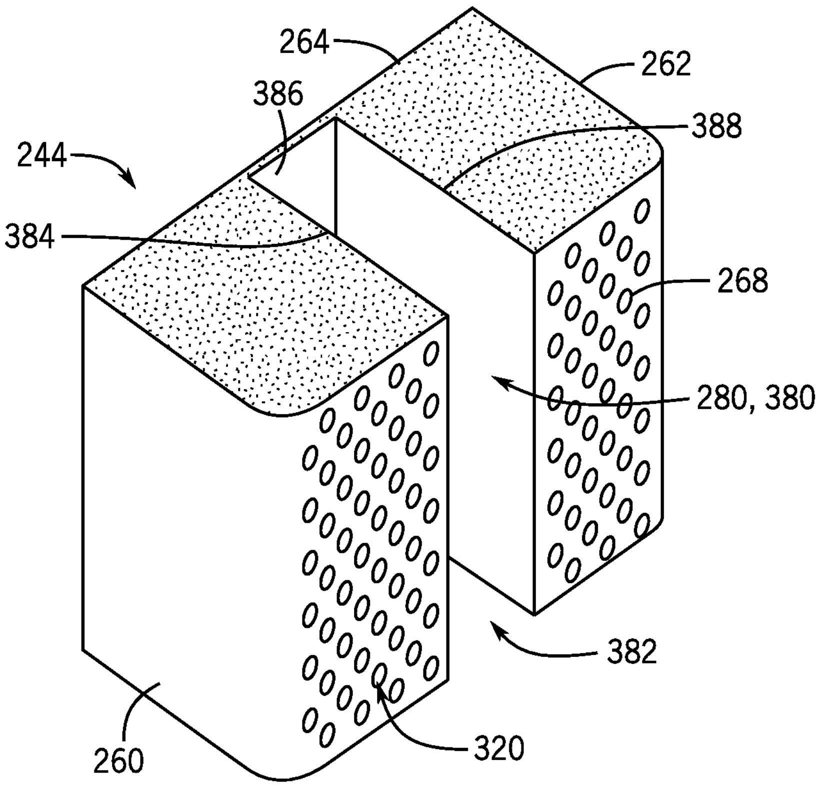
FIG. 17 is a perspective view of an embodiment of a baffle for a silencer module, in accordance with an aspect of the present disclosure.
Figure 18:
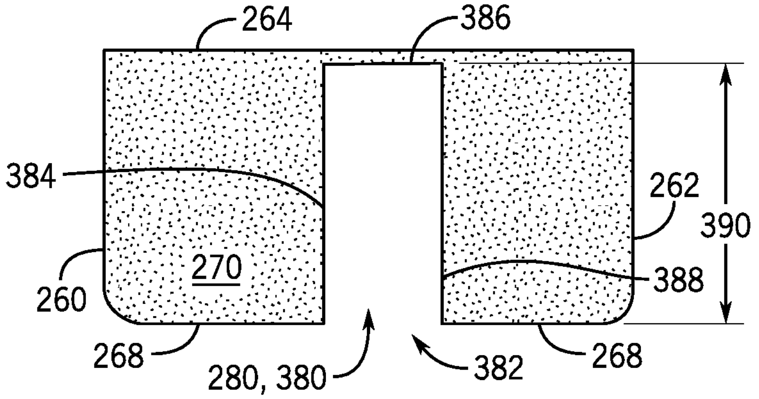
FIG. 18 is a cross-sectional top view of an embodiment of a baffle for a silencer module, in accordance with an aspect of the present disclosure.

FIG. 17 is a perspective view of an embodiment of the first baffle 244, in which the reactive acoustic feature 280 is a quarter wave tube 380. FIG. 18 is a cross-sectional top view of an embodiment of the first baffle 244 shown in FIG. 17. FIGS. 17 and 18 will be discussed concurrently below. It should be understood that the second baffle 246 may include a portion of or all of the features of the first baffle 244 discussed below. As shown in the illustrated embodiments, the quarter wave tube 380 may include a throat 382 (e.g., passage, flow path) that extends from the inner panel 268 toward the outer panel 264. The throat 382 may be defined between a first throat wall 384, a second throat wall 386, and a third throat wall 388 of the first baffle 244. The first throat wall 384 and the third throat wall 388 may extend generally parallel to one another and generally orthogonal or cross-wise to the second throat wall 386. In some embodiments, the first, second, and third throat walls 384, 386, 388 may not include the perforations 320 formed therein and, instead, may form a section of continuous (e.g., non-perforated) material. In other embodiments, any one or combination of the first, second, and third throat walls 384, 386, 388 may include the perforations 320 and, thus, fluidly couple the throat 382 to the interior volume 270. A length of the throat 382 may be indicative of a length 390 of the first or third throat wall 384 or 388.

The quarter wave tube 380 may be configurable (e.g., tunable) to attenuate particular frequencies of acoustic waves that may pass through the air channel 248 in the downstream direction 58, for example. That is, the quarter wave tube 380 may be configured to reduce, mitigate, or substantially inhibit traversal of certain frequencies of acoustic waves (e.g., frequencies corresponding to the peaks 210, 212, and/or 214) through the air channel 248 from the upstream chamber 242 to the downstream chamber 242.

In particular, the quarter wave tube 380 may be designed to have an attenuation frequency (e.g., a target attenuation frequency) that may correspond to frequencies of one or more of the peaks 210, 212, and 214 and, therefore, enable the quarter wave tube 380 to attenuate the peaks 210, 212, and/or 214. To this end, the quarter wave tube 380 may operate similarly to the resonator 284 to attenuate certain frequencies of acoustic waves in a targeted manner. The attenuation frequency of the quarter wave tube 380 may be determined via Equation III (Eq. III) below, where 'c' represents the speed of sound, '$l_e$' represents the length of the throat 382 (e.g., the length 390), and 'n' represents a numeric integer value.

$$f = \frac{(2n-1)c}{4l_e} \quad \text{(Eq. III)}$$

In accordance with Eq. III above, the length of the quarter wave tube 380 may be adjusted to include desired attenuation frequencies. As such, when implemented in the silencer module 240, the quarter wave tube 380 may be tuned to enable the silencer module 240 to more effectively attenuate tonal noise (e.g., the peaks 210, 212, and/or 214). That is, the quarter wave tube 380 may facilitate mitigating or diminishing an amplitude of sound waves that may be reemitted from the quarter wave tube 380 (e.g., upon entry into the quarter wave tube 380) and propagated back into air channel 248. In some embodiments, an attenuation frequency of the quarter wave tube 380 may be the same (e.g., within a threshold percentage of one another) as an attenuation frequency of a corresponding quarter wave tube that may be formed in the second baffle 246. In other embodiments, corresponding quarter wave tubes 380 in the first and second baffles 244, 246 may be configured to have different attenuation frequencies. For example, the quarter wave tube 380 in the first baffle 244 may be configured to have a relatively high attenuation frequency, whereas another quarter wave tube 380 that may be formed in the second baffle 246 may be configured to have a relatively low attenuation frequency.

Figure 19:
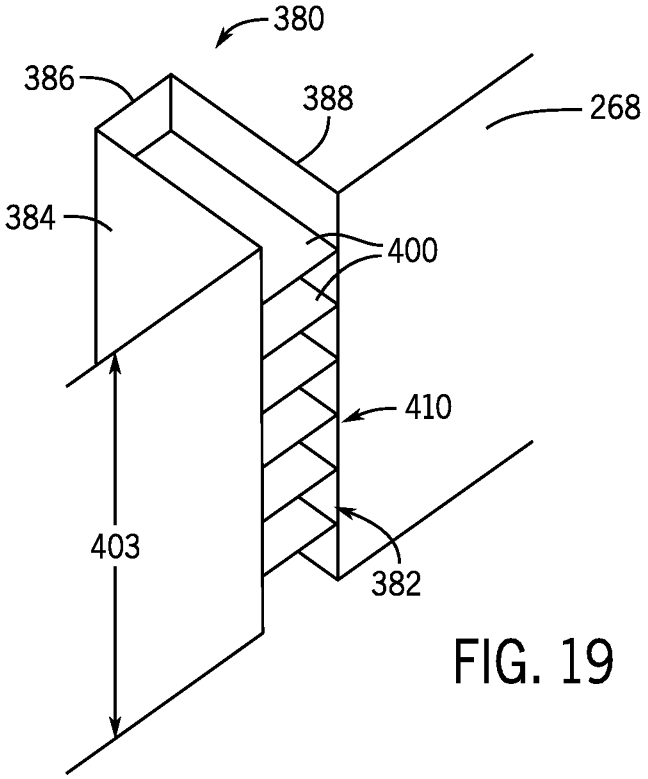
FIG. 19 is a perspective view of an embodiment of a portion of a baffle for a silencer module, in accordance with an aspect of the present disclosure.

FIG. 19 is a perspective view of an embodiment of a portion of the first baffle 244, in which the quarter wave tube 380 includes a plurality of divider walls 400 disposed in the throat 382. In some embodiments, the divider walls 400 may extend across the throat 382 from the first throat wall 384 to the third throat wall 388 and from the inner panel 268 to the second wall 386. The divider walls 400 may be positioned along a height 403 of the throat 382 in a uniform manner or an asymmetric manner. The divider walls 400 may divide the throat 382 into a plurality of throat chambers 410. In certain embodiments, the divider walls 400 may include continuous pieces of material that do not include perforations formed therein. In other embodiments, one or more of the divider walls 400 may include perforations formed therein to facilitate flow of fluid and/or travel of acoustic waves between the throat chambers 410.

Figure 20:
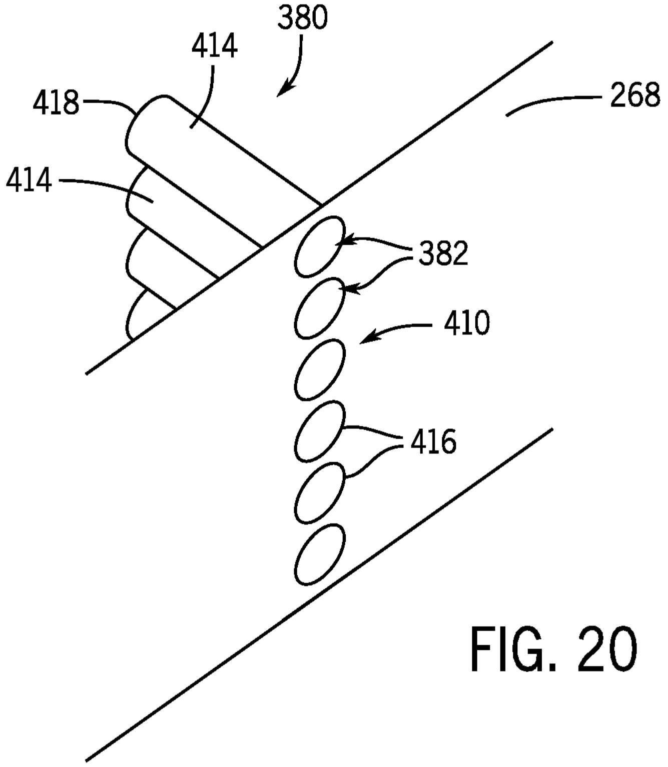
FIG. 20 is a perspective view of an embodiment of a portion of a baffle for a silencer module, in accordance with an aspect of the present disclosure.

FIG. 20 is a perspective view of an embodiment of a portion of the first baffle 244, in which the quarter wave tube 380 is formed from a plurality of conduits 414. In some embodiments, each of the conduits 414 may include a generally circular cross-section and define the throat chambers 410. In other embodiments, the plurality of conduits 414 may include any other suitable cross-sectional geometry. Moreover, the conduits 414 may each include the same cross-sectional geometry in certain embodiments, in other embodiments, cross-sectional geometries of one or more of the conduits 414 may be different from respective cross-sectional geometries of other conduits 414 that may be included in the quarter wave tube 380. Each of the conduits 414 may include a corresponding opening 416 formed in the inner panel 268 that is configured to enable flow of fluid and/or travel of acoustic waves into the corresponding conduit 414. In some embodiments, one or more of the conduits 414 may include end caps 418 that may be coupled to the conduits 414 to define a boundary of respective interior volumes of the conduits 414.

The following discussion continues with reference to FIG. 8. In some embodiments, the reactive acoustic features 280 (e.g., the resonators 284) may be arranged in a parallel configuration in the silencer module 240. As used herein, a "parallel configuration" of the reactive acoustic features 280 may refer to a configuration of the reactive acoustic features 280 in which at least a portion of the throats 290 of the resonators 284 (or the throats 382 of the quarter wave tubes 380) overlap with one another along the longitudinal axis 22. In some embodiments, positioning the reactive acoustic features 280 (e.g., the resonators 284) in a parallel configuration may enable the reactive acoustic features 280 to achieve greater attenuation at a given frequency (e.g., the attenuation frequency of the resonators 284) as opposed to positioning the reactive acoustic features 280 in a non-parallel configuration (e.g., a configuration of the reactive acoustic features 280 in which the throats do not overlap along the longitudinal axis 22). In some embodiments, the reactive acoustic features 280 may instead be positioned in a series configuration in the silencer module 240.

Figure 21:
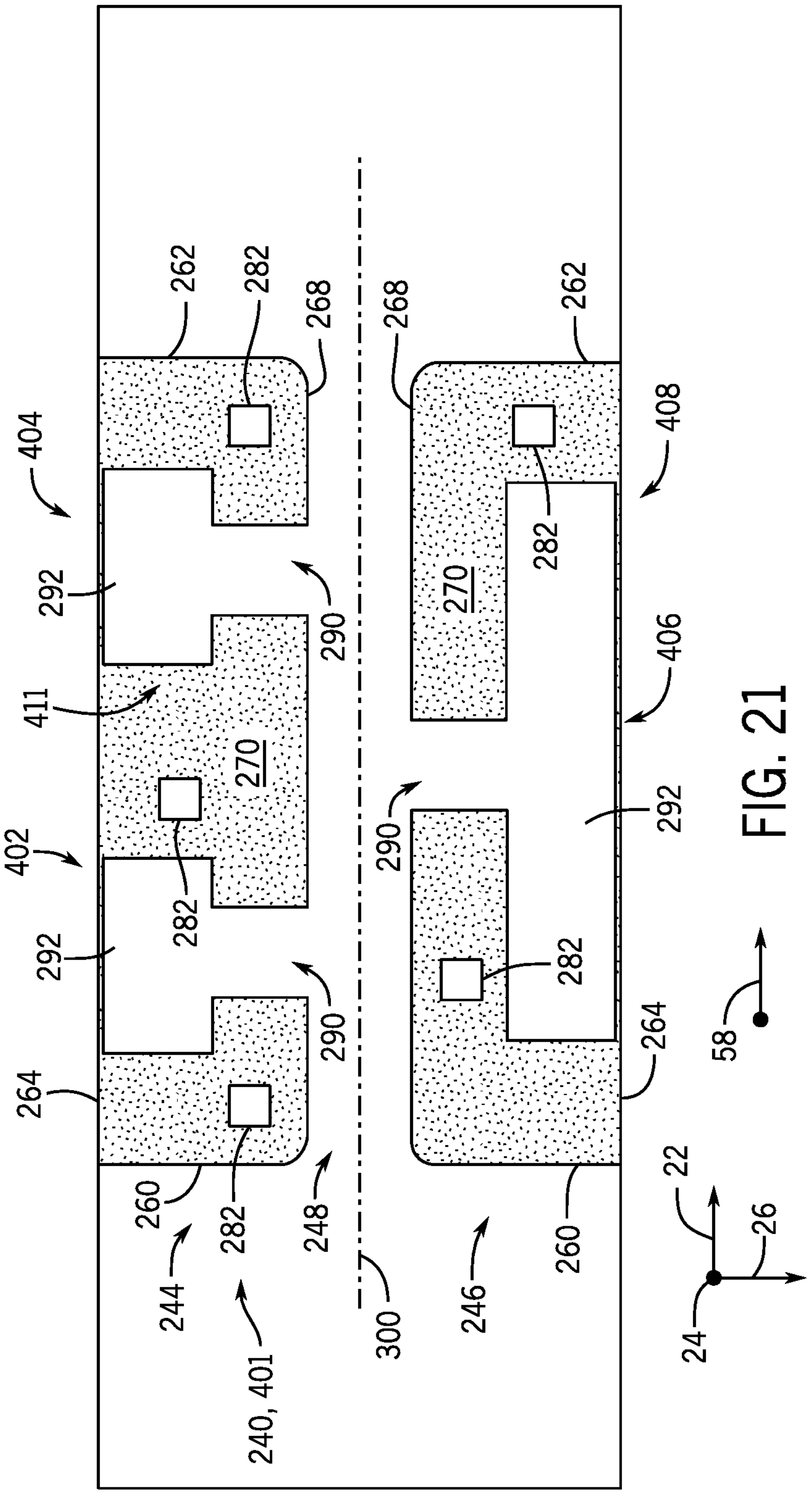
FIG. 21 is a cross-sectional top view of an embodiment of a silencer module, in accordance with an aspect of the present disclosure.

For example, to better illustrate and to facilitate the following discussion, FIG. 21 is a cross-sectional top view of an embodiment of the silencer module 240, referred to herein as a silencer module 401, which includes a first resonator 402, a second resonator 404, and a third resonator 406 (collectively resonators 408) that are positioned in a series configuration 411. As shown in the illustrated embodiment, in the series configuration 411, respective throats 290 of the resonators 408 do not overlap with one another along the longitudinal axis 22 (e.g., along the axis 300).

Figure 22:
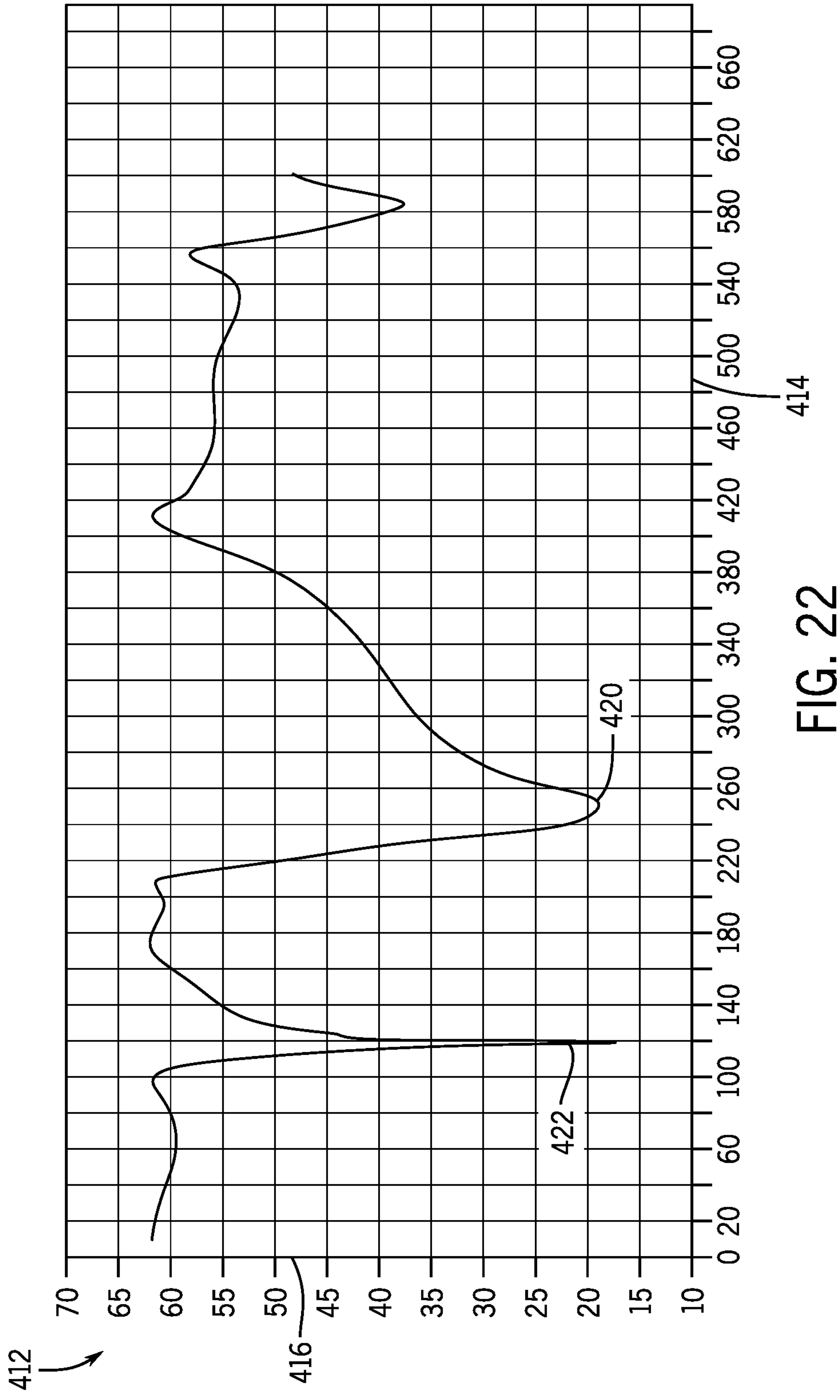
FIG. 22 is a graph of an embodiment of an attenuation profile of a silencer module, in accordance with an aspect of the present disclosure.

In the illustrated embodiment of FIG. 21, the first resonator 402 and the second resonator 404 may include respective resonator chambers 292 having interior volumes that are less than an interior volume of a corresponding resonator chamber 292 of the third resonator 406. In some embodiments, by including resonators 284 having different interior volumes in the silencer module 401, the silencer module 401 may more effectively attenuate tonal noises at various target frequencies. For additional clarity, FIG. 22 is a graph 412 of illustrating an attenuation profile that may be achieved via the silencer module 401. FIGS. 21 and 22 will be discussed concurrently below.

An 'x'-axis 414 of the graph 200 may illustrate an attenuation frequency of acoustic sound (e.g., measured in Hertz [Hz]) of the silencer module 401, and the 'y'-axis 416 of the graph 412 may illustrate a corresponding sound pressure level (e.g., measured in decibels [dB]). The first resonator 402 and the second resonator 404 may attenuate relatively high frequencies of acoustic waves that may enter the silencer module 401 and, thus, generate a first attenuation trough 420 at a relatively high frequency value. The third resonator 406 may attenuate relatively low frequencies of acoustic waves and, therefore, generate a second attenuation trough 422 at a relatively low frequency value. To this end, selective positioning and sizing of the first, second, and third resonators 402, 404, 406 may enable generation of a tunable (e.g., customizable) attenuation profile of the silencer module 401.

Figure 23:
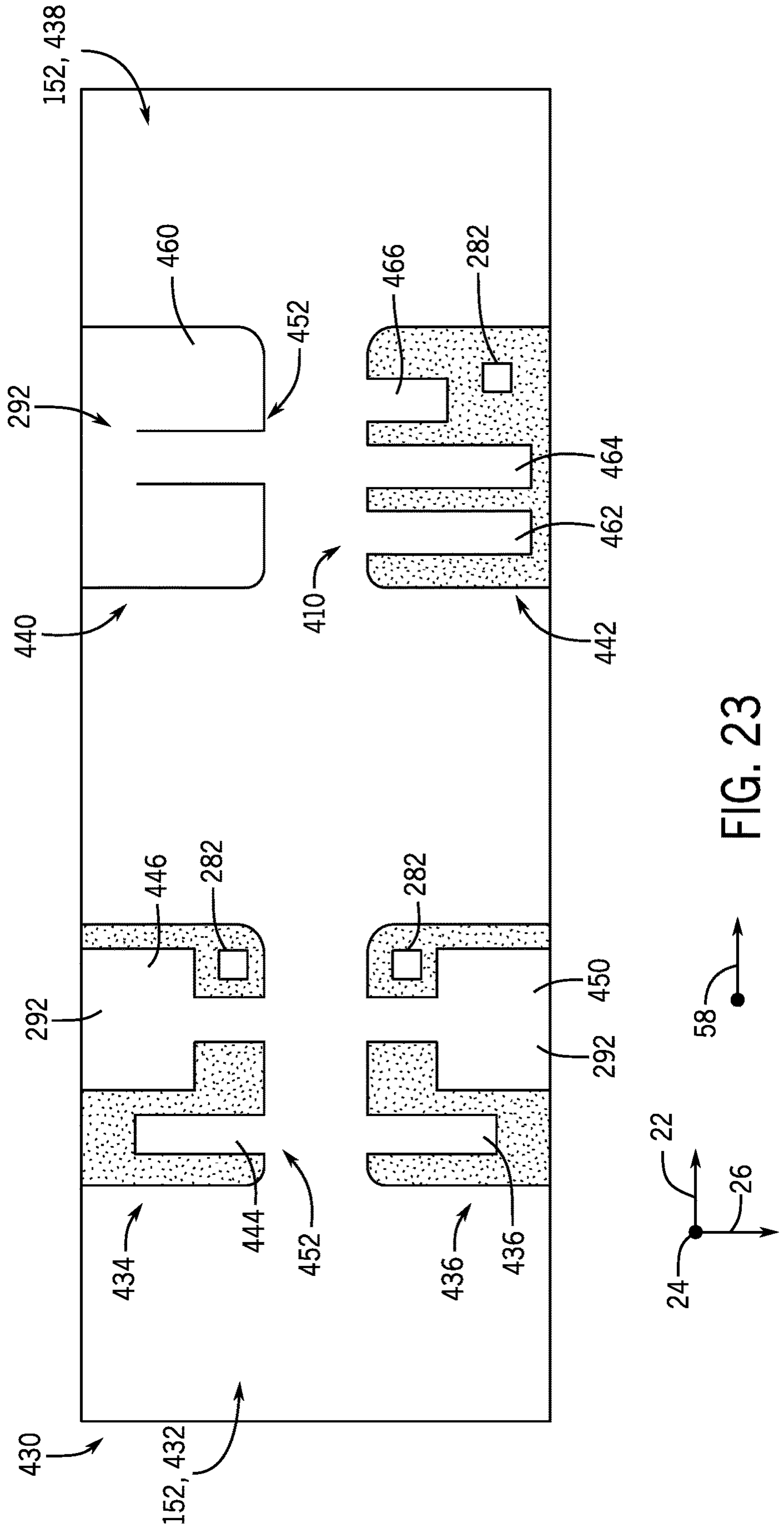
FIG. 23 is a cross-sectional top view of an embodiment of a silencer module, in accordance with an aspect of the present disclosure.

It should be understood that sizes and/or relative arrangements or configurations of the reactive acoustic features 280 (e.g., the resonators 284, the quarter wave tubes 380) and/or sizes and/or relative arrangements or configurations of the absorptive acoustic features 282 may be adjustable to generate multitudinous different attenuation profiles based on, for example, a type of air handling unit 18 in which the silencer module 401 is to be implemented. As a non-limiting example, FIG. 23 is a cross-sectional top view of an embodiment of a silencer assembly 430, illustrating a plurality of silencers 152 including various configurations of the reactive acoustic features 280 and the absorptive acoustic features 282.

In the illustrated embodiment, the silencers 152 include a first silencer module 432 having a first baffle 434 and a second baffle 436 and a second silencer module 438 having a third baffle 440 and a fourth baffle 442. The first baffle 434 includes a first quarter wave tube 444 and a first resonator 446, and the second baffle 436 includes a second quarter wave tube 448 and a second resonator 450. The first and second quarter wave tubes 444, 448 and the first and second resonators 446, 450 are each positioned in respective parallel configurations 452. The third baffle 440 includes a third resonator 460 having a relatively large resonator chamber 292 (e.g., compared to sizes of the resonator chambers 292 of the first and second resonator 446, 450). The fourth baffle 442 includes a third quarter wave tube 462, a fourth quarter wave tube 464, and fifth quarter wave tube 466. Respective lengths of the third and fourth quarter wave tubes 462, 464 are greater than a length of the fifth quarter wave tube 466. The fourth quarter wave tube 464 is in the parallel configuration 452 with the third resonator 460, whereas the third and fifth quarter wave tubes 462, 466 are in the series configuration 411 with the third resonator 460.

Figure 24:
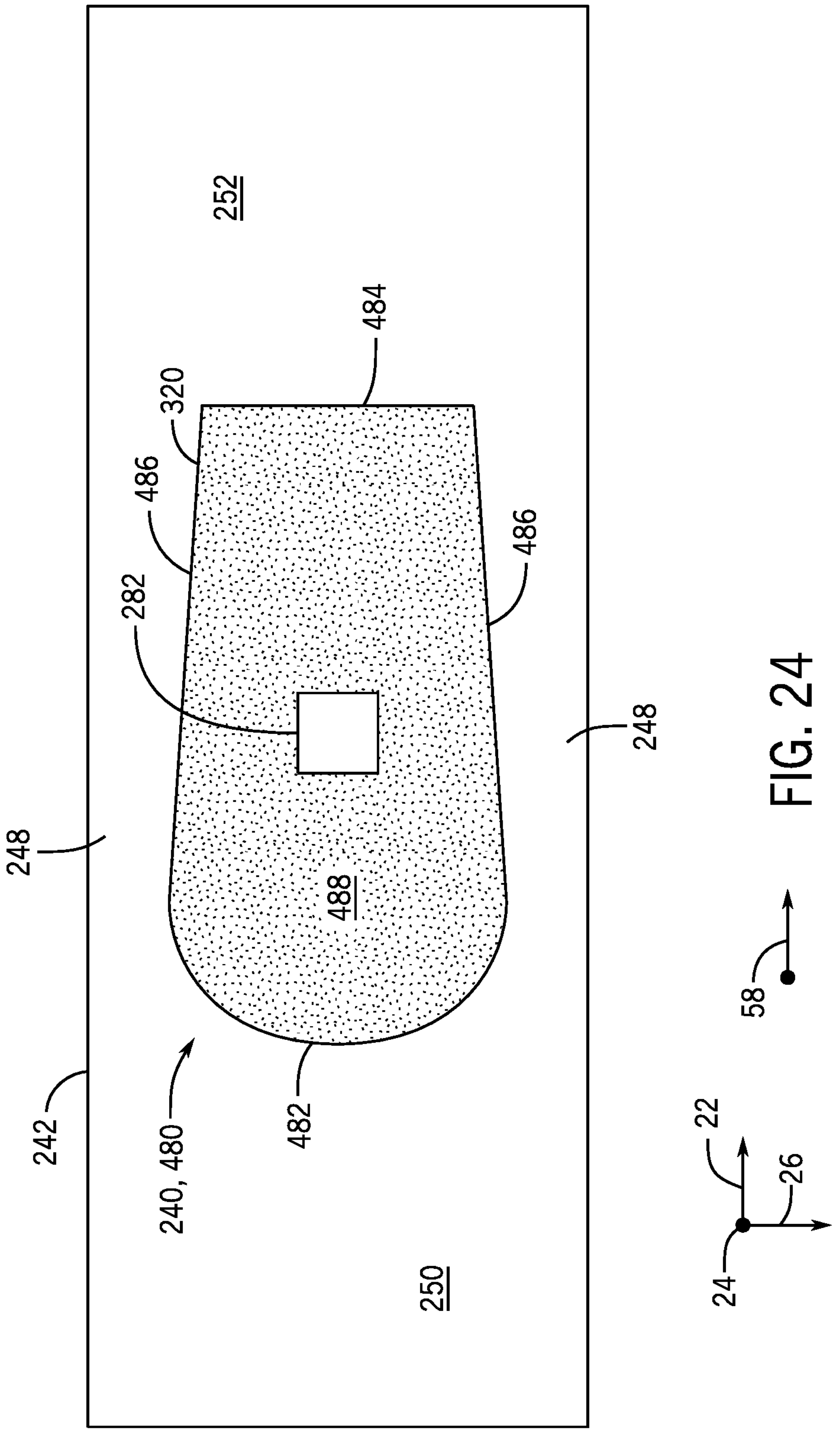
FIG. 24 is a cross-sectional top view of an embodiment of a silencer module, in accordance with an aspect of the present disclosure.
Figure 25:
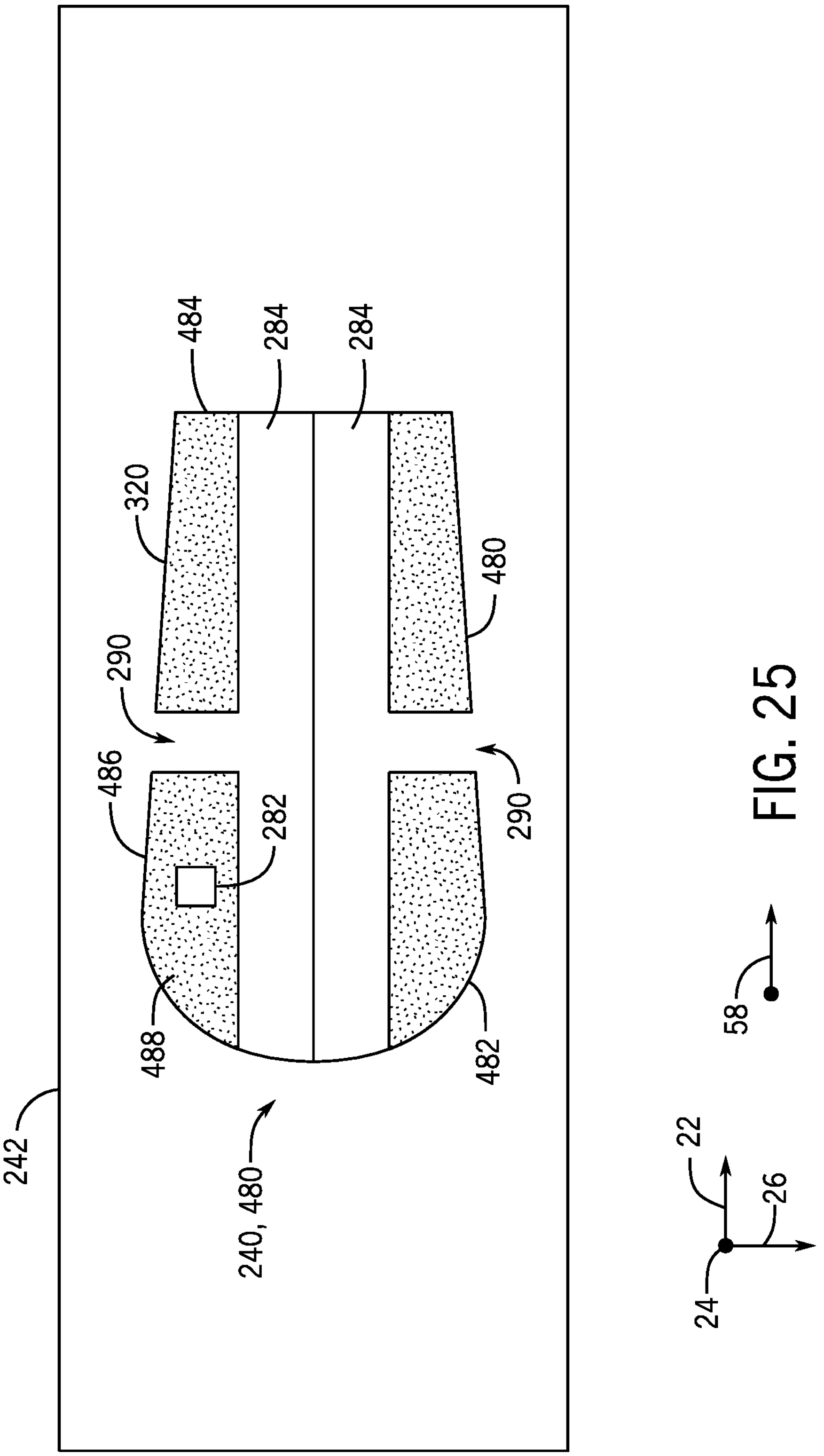
FIG. 25 is a cross-sectional top view of an embodiment of a silencer module, in accordance with an aspect of the present disclosure.

FIG. 24 is a cross-sectional top view of an embodiment of the silencer module 240, referred to herein as a silencer module 480, having a converging cross-sectional geometry. The silencer module 480 includes a curved surface 482 positioned at the upstream portion 250 of the chamber 242, a rear surface 484 positioned at the downstream portion 252 of the chamber 242, and side walls 486 extending between the curved surface 482 and the rear surface 484. In some embodiments, a first width of the silencer module 480 at an interface between the curved surface 482 and the side walls 486 may be greater than a second width of the silencer module 480 at an interface between the rear surface 484 and the side walls 486. As such, the side walls 486 may converge toward one another (e.g., in the downstream direction 58) from an upstream end of the silencer module 480 toward a downstream end of the silencer module 480. In some embodiments, one or both of the side walls 486 may include the perforations 320 formed therein. Moreover, an interior 488 of the silencer module 480 may include the sound absorbing material disposed therein. In some embodiments, the silencer module 480 may further include one or more of the reactive acoustic features 280 (e.g., Helmholtz resonator, quarter wave tube). As a non-limiting example, FIG. 25 is a cross-sectional top view of an embodiment of the silencer module 480, in which the silencer module 480 includes a pair of resonators 284.

Figure 26:
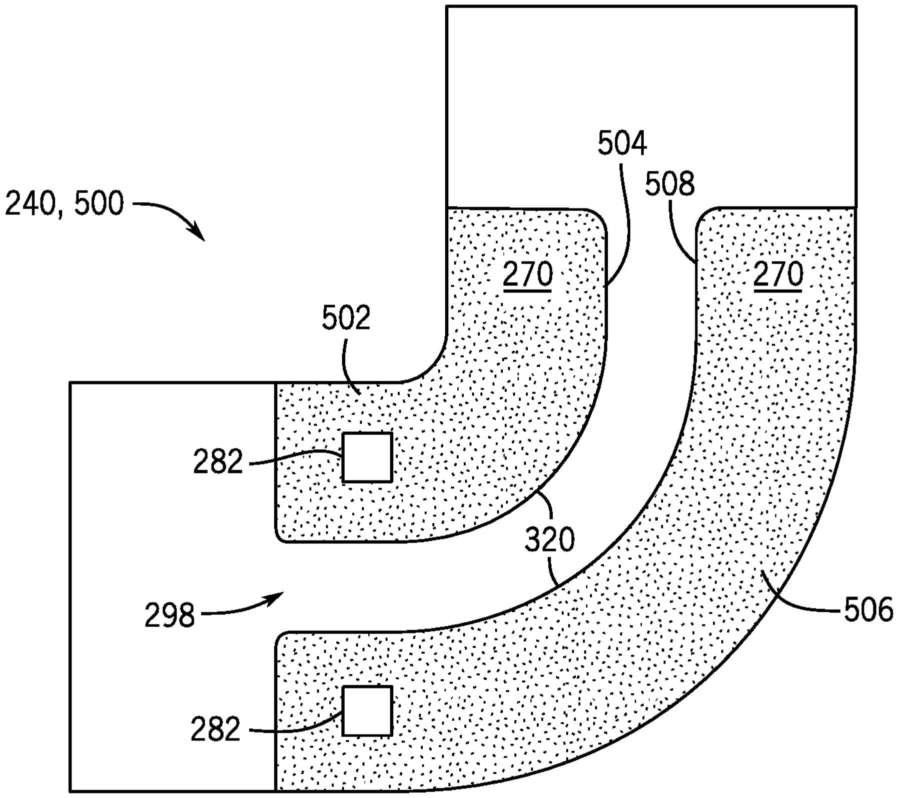
FIG. 26 is a cross-sectional top view of an embodiment of a silencer module, in accordance with an aspect of the present disclosure.
Figure 27:
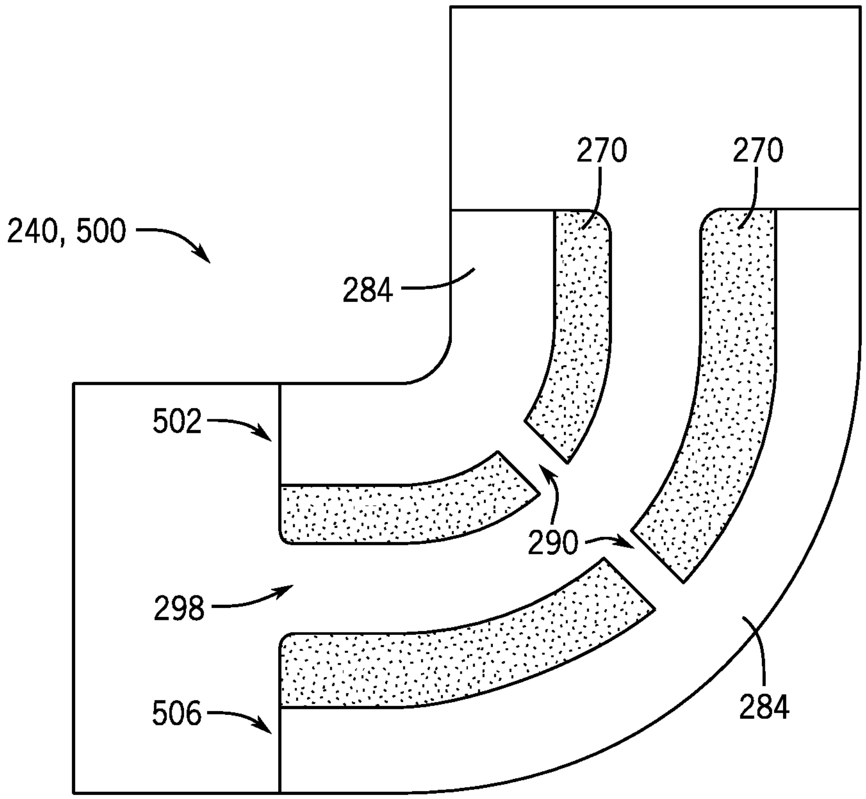
FIG. 27 is a cross-sectional top view of an embodiment of a silencer module, in accordance with an aspect of the present disclosure.

FIG. 26 is a cross-sectional top view of an embodiment of the silencer module 240, referred to herein as a silencer module 500, in which the air channel 248 through the silencer module 500 is curved (e.g., non-linear). The silencer module 500 includes a first baffle 502 having a first curved surface 504 and a second baffle 506 having a second curved surface 508. In some embodiments, one or both of the curved surfaces 504, 508 may include the perforations 320 formed therein. Moreover, respective interior volumes 270 of either or both of the baffles 502, 506 may include the sound absorbing material 322 disposed therein. In some embodiments, the silencer module 500 may further include one or more of the reactive acoustic features 280 (e.g., Helmholtz resonator, quarter wave tube). As a non-limiting example, FIG. 27 is a cross-sectional top view of an embodiment of the silencer module 500, in which the silencer module 500 includes a pair of resonators 284.

Figure 28:
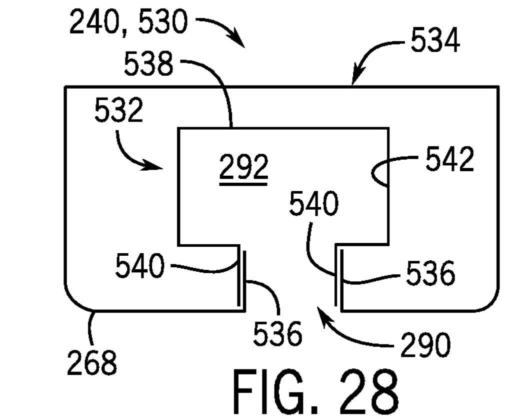
FIG. 28 is a cross-sectional top view of an embodiment of a baffle for a silencer module, in accordance with an aspect of the present disclosure.
Figure 29:
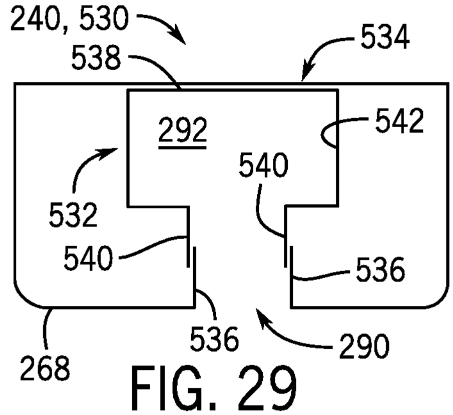
FIG. 29 is a cross-sectional top view of an embodiment of a baffle for a silencer module, in accordance with an aspect of the present disclosure.

FIG. 28 is a cross-sectional top view of an embodiment of the silencer module 240, referred to herein as a silencer module 530, which includes an adjustable resonator 532. The silencer module 530 may include an outer shell 534 that includes the inner panel 268 and first throat walls 536. The silencer module 530 includes an inner shell 538 that may include second throat walls 540 and a set of walls 542 (e.g., resonator walls) that define the resonator chamber 292. The second throat walls 540 may be engageable with the first throat walls 536 at a plurality of positions to enable adjustment of a throat length of the throat 290. That is, the second throat walls 540 may be moveable relative to the first throat walls 536. Adjustment of the throat length may thereby alter an attenuation profile of the resonator 532. For example, in the illustrated embodiment of FIG. 28, the inner shell 538 is in a first configuration, in which the throat length of the throat 290 may be relatively short. FIG. 29 is a cross-sectional top view of an embodiment of the silencer module 530, illustrating the inner shell 538 in a second configuration, in which the throat length of the throat 290 is relatively long (e.g., as compared to the throat length in the first configuration of the inner shell 538). In accordance with the present techniques, the silencer module 530 may be tunable on-site, after installation in the air handling unit 18, for example, to achieve a desired attenuation profile. It should be understood that the aforementioned techniques may similarly by used to adjust a throat length of the quarter wave tube 380.

Figure 30:
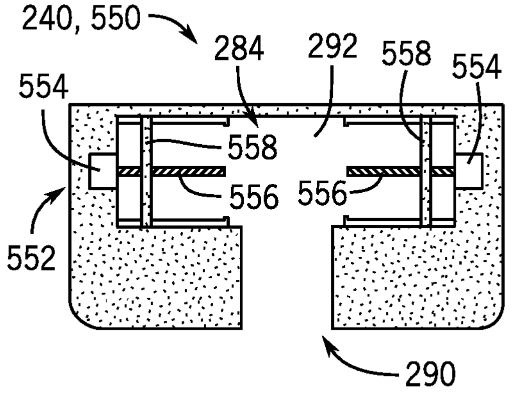
FIG. 30 is a cross-sectional top view of an embodiment of a baffle for a silencer module, in accordance with an aspect of the present disclosure.
Figure 31:
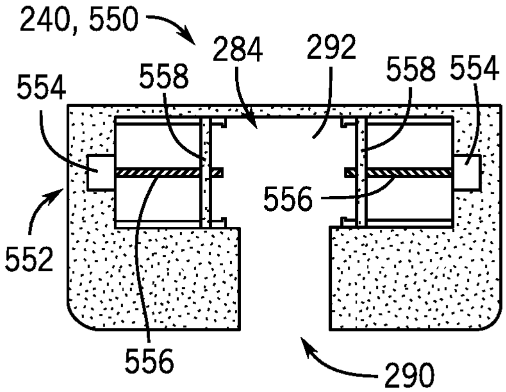
FIG. 31 is a cross-sectional top view of an embodiment of a baffle for a silencer module, in accordance with an aspect of the present disclosure.

FIG. 30 is cross-sectional top view of an embodiment of the silencer module 240, referred to herein as a silencer module 550, including an actuatable tuning system 552. The actuatable tuning system 552 may be configured to adjust a volume of the resonator chamber 292 of the resonator 284 and, thus, adjust an attenuation profile of the resonator 284. In some embodiments, the actuatable tuning system 552 includes actuators 554 (e.g., electric motors) coupled to shafts 556. The shafts 556 may be coupled to baffles 558 disposed within the resonator chamber 292. The actuators 554 may be configured to drive rotation of the shafts 556 to adjust relative positions of the baffles 558 within the resonator chamber 292 and, thus, to adjust an effective volume of the resonator chamber 292. For example, in the illustrated embodiment, the baffles 558 are positioned in a first configuration (e.g., an expanded configuration), such that an effective volume of the resonator chamber 292 is relatively large. FIG. 31 is a cross-sectional top view of an embodiment of the silencer module 550, illustrating the baffles 558 in a second configuration (e.g., a contracted configuration), such that the effective volume of the resonator chamber 292 is relatively small. In accordance with the present techniques, the silencer module 550 may be tunable on-site, after installation in the air handling unit 18, for example, to achieve a desired attenuation profile. It should be understood that any other suitable drive mechanism (e.g., linear actuators, pneumatic actuators) may be used in addition to, or in lieu of, the actuators 554 to transition the baffles 558 between the first and second configurations.

In some embodiments, the actuators 554 may be communicatively coupled to the control device 16 or another suitable controller and adjustable based on inputs (e.g., control signals) received from the control device 16 or other controller. For example, in some embodiments, the control device 16 may be configured to automatically adjust positions of the baffles 558 based on sensor feedback (e.g., data signals provided from an acoustic sensor) to more effectively attenuate acoustic energy that may be generated during operation of the air handling unit 18. In some embodiments, the sensor feedback received by the control device 16 may include feedback indicative of tonal noise. The control device 16 may be configured to determine (e.g., calculate) a target value for the effective volume of the resonator chamber 292 (e.g., based on control algorithms, look-up tables, etc.) that more effectively attenuates the tonal noise identified in the sensor feedback and may adjust the baffles 558 (e.g., via input sent to the actuators 554) such that the effective volume of the resonator chamber 292 achieves the target value.

Figure 32:
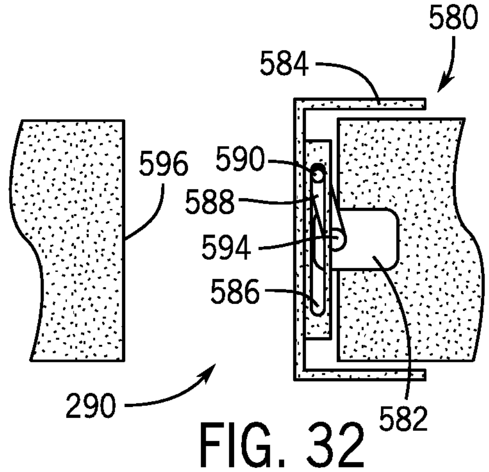
FIG. 32 is a cross-sectional top view of an embodiment of a portion of a baffle for a silencer module, in accordance with an aspect of the present disclosure.
Figure 33:
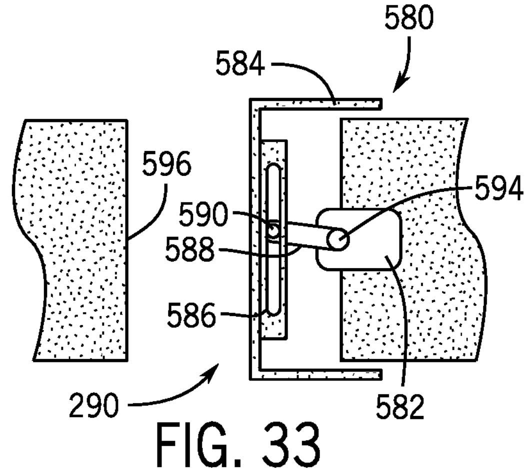
FIG. 33 is a cross-sectional top view of an embodiment of a portion of a baffle for a silencer module, in accordance with an aspect of the present disclosure.

FIG. 32 is a cross-sectional top view of an embodiment of a portion of a silencer module 240 that includes a throat adjustment system 580. The throat adjustment system 580 is configured to adjust a cross-sectional area of the throat 290 and, thus, adjust the attenuation profile of a silencer module (e.g., the silencer module 240) having the throat adjustment system 580. The throat adjustment system 580 may include an actuator 582, a baffle 584 having a slot 586, and an arm 588 that is coupled to the actuator 582 and the slot 586. In particular, the arm 588 may include a drive pin 590 that is configured to moveably couple the arm 588 to the slot 586. The actuator 582 may be configured to rotate the arm 588 about an axis 594 to induce slideable movement of the drive pin 590 along the slot 586. Slideable movement of the drive pin 590 along the slot 586 may in turn cause translational movement of the baffle 584 toward or away from an opposing throat wall 596 of the throat 290. In the illustrated embodiment, the baffle 584 is positioned in a first configuration, in which an effective throat width of the throat 290 is relatively large. FIG. 33 is a cross-sectional top view of an embodiment of a portion of a silencer module 240 in which the baffle 584 is in a second configuration, in which the effective throat width of the throat 290 is relatively narrow. It should be understood that any other suitable drive mechanism (e.g., linear actuators, pneumatic actuators) may be used in addition to, or in lieu of, the actuator 582 to transition the baffle 584 between the first and second configurations. In some embodiments, the actuator 582 may be communicatively coupled to the control device 16 or another suitable controller, such that the control device 16 or other controller may operate the actuator 582 to automatically adjust a position of the baffle 584 based on sensor feedback in accordance with the techniques discussed above.

As set forth above, embodiments of the present disclosure may provide one or more technical effects useful for more effectively attenuating particular (e.g., targeted) frequencies of sound waves (e.g., tonal noises) and broad band noise that may be generated during operation of an air handling unit via a silencer module. To this end, the silencer module may reduce a level of sound or audible noise that may propagate from the air handling unit and into spaces of a building or other structure serviced by the air handling unit. It should be understood that the technical effects and technical problems in the specification are examples and are not limiting. Indeed, it should be noted that the embodiments described in the specification may have other technical effects and can solve other technical problems.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A silencer module for an air handling unit, comprising:
- a first baffle comprising a first plurality of panels defining a first interior volume of the first baffle and a first outer perimeter of the first baffle;
- a second baffle spaced apart from the first baffle to form an air channel between the first baffle and the second baffle, wherein the air channel is configured to receive a fluid flow and direct the fluid flow through the silencer module; and
- a reactive acoustic feature formed in the first baffle within the first outer perimeter of the first baffle, wherein the reactive acoustic feature comprises an attenuation profile configured to reduce propagation of tonal acoustic waves through the air channel, and the reactive acoustic feature is separated from the first interior volume via a first plurality of walls of the first baffle.

2. The silencer module of claim 1, wherein the first plurality of panels comprises a first panel that bounds a portion of the first interior volume of the first baffle, the second baffle comprises a second plurality of panels, the second plurality of panels comprises a second panel that bounds an additional portion of a second interior volume of the second baffle, and the air channel is formed between the first panel and the second panel.

3. The silencer module of claim 2, wherein the reactive acoustic feature comprises:
- a throat extending through the first panel; and
- a resonator chamber fluidly coupled to the throat, wherein a first dimension of the throat along an axis of the air channel is less than a second dimension of the resonator chamber along the axis of the air channel.

4. The silencer module of claim 3, wherein the throat comprises:
- a first subset of the first plurality of walls extending from the first panel; and
- a second subset of the first plurality of walls extending from resonator walls of the first plurality of walls defining the resonator chamber, wherein the second subset of the first plurality of walls is moveable relative to the first subset of the first plurality of walls to adjust a length of the throat.

5. The silencer module of claim 1, wherein the first baffle comprises:
- perforations configured to fluidly couple the air channel with the first interior volume of the first baffle; and
- sound absorbing material disposed within the first interior volume and configured to absorb broad band acoustic waves to reduce propagation of the broad band acoustic waves through the air channel.

6. The silencer module of claim 5, wherein the sound absorbing material comprises fiberglass, mineral wool, steel wool, foam, natural cotton, micro-perforated metal, or a combination thereof.

7. The silencer module of claim 1, comprising an additional reactive acoustic feature formed in the second baffle, wherein the additional reactive acoustic feature comprises an additional attenuation profile configured to reduce propagation of the tonal acoustic waves through the air channel.

8. The silencer module of claim 7, wherein the reactive acoustic feature and the additional reactive acoustic feature are positioned in a parallel configuration with respect to an axis of the air channel.

9. The silencer module of claim 7, wherein the reactive acoustic feature and the additional reactive acoustic feature are positioned in a series configuration with respect to an axis of the air channel.

10. The silencer module of claim 7, wherein the reactive acoustic feature includes a resonator chamber having a first volume, and the additional reactive acoustic feature includes an additional resonator chamber having a second volume greater than the first volume.

11. The silencer module of claim 1, wherein the reactive acoustic feature comprises a quarter wave tube.

12. A baffle for a silencer module of an air handling unit, comprising:

a shell comprising a plurality of panels defining an interior volume of the baffle and defining an outer perimeter of the baffle, wherein the plurality of panels comprises a panel having perforations formed therein;

a reactive acoustic feature formed within the outer perimeter of the baffle, wherein the reactive acoustic feature comprises a throat in fluid communication with an air passage external to the shell, the reactive acoustic feature comprises an attenuation profile configured to attenuate tonal acoustic waves, and the reactive acoustic feature is separated from the interior volume by a plurality of walls of the baffle; and a sound absorbing material disposed within the interior volume, wherein the sound absorbing material is fluidly coupled to the air passage via the perforations, and wherein the sound absorbing material is configured to attenuate broad band acoustic waves.

13. The baffle of claim 12, wherein the reactive acoustic feature includes a resonator chamber fluidly coupled to the throat, a first width of the throat is less than a second width of the resonator chamber, the throat is defined by throat walls of the plurality of walls, and the resonator chamber is defined by resonator walls of the plurality of walls.

14. The baffle of claim 12, wherein the reactive acoustic feature comprises a quarter wave tube.

15. The baffle of claim 12, wherein the sound absorbing material comprises fiberglass, mineral wool, steel wool, foam, natural cotton, micro-perforated metal, or a combination thereof.

16. The baffle of claim 12, comprising an additional reactive acoustic feature formed in the shell that comprises an additional attenuation profile configured to attenuate the tonal acoustic waves.

17. A silencer module for an air handling unit, comprising:

a first baffle, comprising:

a first shell comprising a first plurality of panels defining a first interior volume of the first baffle and defining a first outer perimeter of the first baffle, wherein the first plurality of panels comprises a first panel having first perforations formed therein; and a first reactive acoustic feature formed within the first outer perimeter of the first baffle, wherein the first reactive acoustic feature comprises a first throat in fluid communication with an air channel external to the first shell, and the first reactive acoustic feature is separated from the first interior volume by a first plurality of walls of the first baffle; and a second baffle, comprising:

a second shell comprising a second plurality of panels defining a second interior volume of the second baffle and defining a second outer perimeter of the second baffle, wherein the second plurality of panels comprises a second panel having second perforations formed therein, wherein the first panel is spaced apart from the second panel to form the air channel between the first panel and the second panel; and a second reactive acoustic feature formed within the second outer perimeter of the second baffle, wherein the second reactive acoustic feature comprises a second throat in fluid communication with the air channel external to the second shell, and the second reactive acoustic feature is separated from the second interior volume by a second plurality of walls of the second baffle, wherein the first reactive acoustic feature and the second reactive acoustic feature each comprise an attenuation profile configured to reduce propagation of tonal acoustic waves through the air channel.

18. The silencer module of claim 17, wherein the first baffle comprises sound absorbing material disposed within the first interior volume and in fluid communication with the air channel via the first perforations, wherein the sound absorbing material is configured to reduce propagation of broad band acoustic waves through the air channel.

19. The silencer module of claim 17, wherein the first reactive acoustic feature and the second reactive acoustic feature are positioned in a parallel configuration with respect to an axis of the air channel.

20. The silencer module of claim 17, wherein the first reactive acoustic feature and the second reactive acoustic feature are positioned in a series configuration with respect to an axis of the air channel.

* * * * *